(12) United States Patent
Boodoo et al.

(10) Patent No.: US 8,883,012 B2
(45) Date of Patent: Nov. 11, 2014

(54) REDUCED FOULING OF REVERSE OSMOSIS MEMBRANES

(75) Inventors: Francis Boodoo, Bala Cynwyd, PA (US); Fabio Chaves De Sousa, Sao Paulo (BR); James A. Dale, Cardiff (GB); Carmen Mihaela Iesan, Fagaras (RO)

(73) Assignee: Purolite Corporation, Bala Cynwyd, PA (US)

( * ) Notice: Subject to any disclaimer, the term of this patent is extended or adjusted under 35 U.S.C. 154(b) by 0 days.

(21) Appl. No.: 12/015,429

(22) Filed: Jan. 16, 2008

(65) Prior Publication Data

US 2008/0173583 A1    Jul. 24, 2008

Related U.S. Application Data

(60) Provisional application No. 60/885,855, filed on Jan. 19, 2007, provisional application No. 60/908,172, filed on Mar. 26, 2007.

(51) Int. Cl.
| | | |
|---|---|---|
| B01D 15/04 | (2006.01) |
| C02F 1/42 | (2006.01) |
| C02F 1/58 | (2006.01) |
| B01D 61/02 | (2006.01) |
| C02F 1/44 | (2006.01) |
| B01J 41/00 | (2006.01) |
| C02F 101/10 | (2006.01) |
| C02F 9/00 | (2006.01) |

(52) U.S. Cl.
CPC ........... *C02F 1/441* (2013.01); *C02F 2001/422* (2013.01); *C02F 2101/10* (2013.01); *C02F 2303/16* (2013.01); *C02F 1/42* (2013.01); *C02F 9/00* (2013.01); *C02F 2001/425* (2013.01); *C02F 2303/185* (2013.01)

USPC .......... 210/690; 210/651; 210/652; 210/660; 210/670; 210/692

(58) Field of Classification Search
USPC ......... 210/650–652, 660, 670, 677, 690, 691, 210/692
See application file for complete search history.

(56) References Cited

U.S. PATENT DOCUMENTS

| 3,454,493 A | 7/1969 | Kun et al. |
| 4,076,622 A | 2/1978 | Costin |

(Continued)

FOREIGN PATENT DOCUMENTS

| JP | 51-88473 | 8/1976 |
| JP | 52-62183 | 5/1977 |

(Continued)

OTHER PUBLICATIONS

Dickert, Charles. Kirk-Othmer Encyclopedia of Chemical Technology: "Ion Exchange". John Wiley & Sons, Inc. vol. 14, (c) 1995, pp. 1-51.*

(Continued)

*Primary Examiner* — Katherine Zalasky
(74) *Attorney, Agent, or Firm* — Fish & Richardson P.C.

(57) ABSTRACT

The present invention provides a new water purification method and system using reverse osmosis. In particular, the present invention provides methods and water purification systems using an ion exchange resin and absorbent media for pretreatment of water being fed to a reverse osmosis treatment system, where the pretreatment reduces fouling of, or deposits or chemical attack on the membrane surfaces and passageways. Particularly, a macroporous resin having an average pore diameter in the range of 1,000 to 500,000 Angstroms and a crush strength or Chatillon value of at least 24 g/bead (710 μm bead diameter) is used.

14 Claims, 10 Drawing Sheets

Typical Surface Water Pretreatment System with Invention

(56) References Cited

U.S. PATENT DOCUMENTS

| | | | |
|---|---|---|---|
| 4,895,659 A * | 1/1990 | Semmens et al. | 210/638 |
| 4,969,991 A * | 11/1990 | Valadez | 210/96.2 |
| 5,259,972 A | 11/1993 | Miyamaru et al. | |
| 5,374,357 A * | 12/1994 | Comstock et al. | 210/666 |
| 5,470,461 A * | 11/1995 | Ban et al. | 210/188 |
| 5,512,604 A * | 4/1996 | Demopolis | 521/142 |
| 6,258,278 B1 * | 7/2001 | Tonelli et al. | 210/652 |
| 6,323,249 B1 | 11/2001 | Dale et al. | |
| 7,291,578 B2 | 11/2007 | SenGupta et al. | |
| 2002/0153319 A1 | 10/2002 | Mukhopadhyay | |
| 2003/0146161 A1 * | 8/2003 | Herman | 210/657 |
| 2004/0129623 A1 * | 7/2004 | Miers et al. | 210/264 |
| 2004/0262206 A1 | 12/2004 | Gettman | |

FOREIGN PATENT DOCUMENTS

| | | |
|---|---|---|
| JP | 4-108587 | 4/1992 |
| JP | 4-210288 | 7/1992 |

OTHER PUBLICATIONS

Purolite Technical Bulletin, "Organic fouling of anion ion exchange resins," (2002), available at <http://www.purolite.com>, accessed Feb. 8, 2014.*

Comstock, Daniel, "Cleaning and Scale Prevention in Reverse Osmosis Systems," Ultrapure Water Magazine, Sep. 2000, pp. 29, 31-34, 36.

Siverns, Steve, "Using Ultrafiltration as a Pretreatment Before RO," Ultrapure Water Magazine, May 2006, (4 pgs).

Mierzejewski, Marek, "Industrial Applications Using Mircofiltration as RO Pretreatment," Ultrapure Water Magazine, Oct. 2004, pp. 29-35.

"Hydranautics Design Limits," Hydranautics: High Performance Membrane Products, Jan. 23, 2001, www.hydranautics.com/docs/trc/Dsgn_Lmt.pdf (1 page).

* cited by examiner

Fig. 1 - Typical Conventional Surface Water Pretreatment System

Fig. 2 –Newer Ultrafiltration Membrane Pretreatment to RO Systems

Fig. 3 - Typical Surface Water Pretreatment System with Invention

REDUCED FOULING OF REVERSE OSMOSIS MEMBRANES

CROSS REFERENCE TO RELATED APPLICATIONS

The present invention claims priority to U.S. Provisional Application No. 60/885,855, filed Jan. 19, 2007, and U.S. Provisional Patent Application No. 60/908,172, filed Mar. 26, 2007, both of which are herein incorporated by reference in their entirety.

FIELD OF THE INVENTION

The present invention relates generally to water purification using reverse osmosis and nanofiltration membranes. In particular, the present invention provides methods and water purification systems using an ion exchange resin system for pretreatment of water being fed to a reverse osmosis or nanofiltration membrane treatment system, where the pretreatment reduces fouling of the membrane surfaces and passageways.

BACKGROUND OF THE INVENTION

Reverse osmosis (RO) and nanofiltration (NF) membrane systems routinely provide desalinated or demineralized water to the power, chemical process, semiconductor, and pharmaceutical industries. Desalination of brackish and seawater for potable use similarly employs these membrane systems, and will play an even greater role as world population grows and clean water becomes more scarce.

Despite the rapid growth rate, the cost of membrane treated water continues to be affected by a number of operational issues related to contaminants generally present in the water supply. Central to the problems are the semi-permeable membranes which are essentially discrete filters, with RO membranes capable of rejecting matter having an average diameter larger than 0.0001 micron (1 Angstrom), such as atoms and molecules, and NF membranes rejecting dissolved species having an average diameter greater than 0.0005 micron (5 Angstroms).

Contaminants larger than these sizes, such as suspended or colloidal particulates (e.g., silt, clay, colloidal species of silica, organics, aluminum and iron) and large organic molecules (e.g., humic and fulvic acids) naturally present in many water supplies, are readily rejected. These contaminants become concentrated in the reject water stream from the membrane plants, and have the potential to build-up to concentrations at which they can deposit and foul the sensitive surfaces and pores of the membranes.

Additionally, sparingly soluble salts of calcium, barium, and strontium sulfates and carbonates or salts of calcium phosphate or fluoride can potentially exceed their solubility during such concentration in the reject stream and precipitate as scale on the surface of the membranes. Metals present in the feedwater such as iron, manganese, and aluminum can become oxidized by oxygen intrusion, and such metal oxides can deposit on the surface of the membranes. If bacteria are allowed to enter via the feedwater or via the membranes, for example, due to inadequate sanitization after maintenance work is performed, bacterial slime masses can quickly develop if enough nutrients (organic matter) are available. Such biofilms can coat the membrane surfaces and significantly increase pressure drop across the membranes.

Processing water through the RO system results in a substantial fraction of the water being rejected to waste. This reject stream contains virtually all the contaminants that are larger in size than the pores of the membranes except for a small amount which leaks through into the finished permeate water. Thus, the reject water stream will contain most of the dissolved salts originally present in the feed water along with any loose deposits or foulants formed at the membrane surfaces but which are carried away with the reject water. The bulk of deposits and foulants generally attach themselves to the membrane surfaces and eventually cause enough restriction of flow through the membranes to warrant the need to clean the membranes chemically. However, frequent chemical cleaning of membranes can shorten their useful lives and increase associated operating costs.

To maintain efficient operation, system designers strive to keep the membrane surfaces and passageways as clean and free from fouling, deposits, and microbial clogging as practical. As the membranes and passageways become fouled, the resistance to the flow of water increases, resulting in a higher pressure drop and, consequently, higher pumping costs. As the pressure drop across the membrane increases, the volume of treated (permeate) water decreases while its salinity increases. Correspondingly, the volume of reject water sent to drain increases. This expected loss in efficiency is compensated for in permeate production by increasing the size of and cost of the system. The membrane industry uses a term, referred to as the "Silt Density Index," or (SDI) value of the feed water processed by the membranes, to determine the total surface area of membranes elements needed to treat a specific volumetric flowrate of water. Numerical values range from 1 to 7, with a value of 1 representing minimum fouling, while increasing values represent rapidly deteriorating fouling conditions. For SDI values ranging from 3 to 5, which are typical of surface water supplies containing more colloidal contaminants, the industry standard is to allow for a flowrate of no more than 8 to 14 gallons of water per day per square foot of membrane surface area (8 to 14 GFD). For better quality waters with SDIs ranging from 1 to 3, such as well water supplies which typically have SDI values less than 3, more efficient designs can be made with water flow rates ranging from 14 to 20 gallons of water per square foot of membrane surface area (14 to 20 GFD). The larger amount of membrane surface area needed for water with higher fouling potential equates to higher capital cost for more membranes elements and pressure vessels to hold the membranes, apart from the increased space needed to accommodate the equipment. In addition, operating costs are also higher in terms of extra water purchases for the higher volume of water that must be rejected and for higher waste discharge fees. To maintain permeate production above some minimum level, the membrane plant must also be taken out of service periodically so that routine chemical cleaning of the membranes can be performed to remove foulants, deposits, and microbial slime masses. Generally, chemical cleaning of the membrane is advised when the pressure drop across the membranes (known as the transmembrane pressure or TMP) increases by about 15%, or when permeate water production decreases by about 15%, or when the salinity (or total dissolved solids) of the permeate increases by about 15%. (see Daniel Comstock, *Ultrapure Water Magazine*, September 2000, pp. 30-36).

Conventional membrane systems usually allow for a large fraction of the water to be sent to waste as reject, typically 20 to 30% of the influent water for brackish water and as high as 65% for seawater treatment. This represents a major operating cost component but is necessary, in part, not to exceed the solubility or safe limits for silica especially, and other contaminants like bacteria and sparingly soluble compounds like sulfate and carbonate salts of barium, strontium, and calcium and similar metals. RO Membrane systems incorporate a number of pretreatment steps to minimize fouling, scaling, and biological problems. Suspended solids several microns in size or larger, are relatively easy to remove by traditional filtration methods, such as those using sand or mixtures of sand with various other filtration medias such as anthracite and garnet. On the other hand, colloidal particulates varying in size from as low as 0.008 micron (80 Angstroms) to about 1 micron (10,000 Angstroms) in diameter present a much-larger removal challenge. Such colloidal particulates can remain suspended indefinitely in the water phase and can thus largely slip through the void spaces in such filtration media. While ion exchange resins are useful as prefilters for softening the water (i.e., strong acid cationic resins) and for removing organics (i.e., strong base resins), they have not been available for removing colloidal particulates. While the crush strength of the resins used for water softening or removal of dissolved organic matter is high, on the average ranging from 175 to 500 grams average per bead, high porosity macroporous resins available in the past for the removal of colloids (e.g., Rohm & Haas IRA-938) were very easily crushed. Therefore, they were unacceptable for use in a prefilter for a membrane filter due to rapid increase in pressure drop across the resin and the increased risk of particulate fouling of the membranes by broken-off pieces of resin itself. The crush strength of the macroporous resin previously used for colloidal removal, IRA-938, was measured at 8 grams per bead, which is extremely low compared to standard ion exchange resins which are more robust, having breaking weights ranging from 175 to 500 grams per bead. Because of the major crushing and physical breakdown problems of IRA-938, this resin could not be commercially used and production was discontinued.

A typical conventional pretreatment system for a surface water source will usually include several unit operations including:
 (a) Chlorine dosing into the feed water supply for microbial control;
 (b) Coagulant and polyelectrolyte flocculant chemical dosing upstream of either a clarifier or a static mixer to reduce suspended solids and some of the colloidal particulates and organic matter;
 (c) Downstream multimedia filters consisting of sand, anthracite and garnet to filter out residual suspended solids;
 (d) One or more activated carbon filters for removal of residual chlorine to avoid damage to the membranes and for removal of any residual organic matter present (e.g., humic and fulvic acids);
 (e) An ion exchange water softener using a strong acid cation resin in the sodium form for removal of hardness;
 (f) Alternatively to (e), above, the chemical feed of acid and/or a scale inhibitor for controlling scaling from calcium and barium salts of carbonate and sulfate;
 (g) A final 5-micron filter cartridge to catch any residual suspended solids just before the water is fed to the membranes.

In recent years the industry has resorted to increasingly more expensive techniques for controlling colloidal particulates, utilizing ultrafiltration (UF) and microfiltration membranes (MF) with pore diameter greater than 0.001 micron (10 Angstroms) and 0.1 micron (1000 Angstroms) respectively as prefilters ahead of the reverse osmosis units. UF membrane prefilters have done a good job controlling colloidal particulates compared to the traditional clarification and multimedia filtration methods outlined above. Additionally UF membranes have the ability to reduce organic matter in the water if provisions are made for the feed of suitable chemical coagulant ahead of the membranes. Ultrafiltration and microfiltration used as pretreatment before RO are further discussed in "Using Ultrafiltration as a pretreatment before RO" by Steve Siverns (*Ultrapure Water Magazine*, May 2006) and in "Industrial Applications Using Microfiltration as RO Pretreatment" by Mark Mierzejewski (*Ultrapure Water Magazine,* October 2004, pg 29-35), both of which are herein incorporated by reference. However, these pretreatments have the disadvantages associated with increased operator error, a large capital investment, high maintenance costs, and the additional waste of water from the UF unit.

The removal of dissolved silica from the water stream is also of major interest due to its limited solubility of approximately 150 mg/l at ambient temperatures and the difficulty of removing this contaminant using many standard pretreatment methods. Monomeric silica, a major form of silica present in water, can polymerize into larger molecules. These can then deposit on the membrane surfaces depending on the pH and temperature of water. Calcium or iron if present, can co-react with silica or catalyze the reaction to significantly increase the potential for silica deposition on the membranes.

U.S. Patent Publication 2002/0153319 (herein incorporated by reference) describes what is referred to as the "HERO," or High Efficiency RO" process for high purity water production where traces of silica and boron can be detrimental to downstream ion exchange mixed beds supplying high purity water required for semiconductor manufacturing. Instead of removing silica, the technology concentrates on removing co-precipitating divalent contaminants in the water such calcium, barium, and strontium. The technology also endeavors to increase the solubility of silica by raising the pH of the water to about 10. The principal platforms of the technology are (a) to remove cations, which in combination with other species present at high pH, tend to precipitate sparingly soluble salts on the membrane surfaces and (b) to eliminate non-hydroxide alkalinity to the maximum extent feasible. To accomplish this, the preferred embodiment of the '319 application implements a number of costly pretreatment steps including use of two weak acid cation vessels in series, one operating in the hydrogen form and the other in the sodium form, along with a de-carbonator vessel to release $CO_2$ generated by the hydrogen form weak acid cation vessel. These units require on-going (i.e., daily) skilled operator attention for acid and caustic chemical handling and control, water sampling and testing. After the decarbonator, the water must be re-pumped at additional cost and caustic must then be injected to raise the pH to preferably above 10 before the water is fed to the RO. The increase in solubility of silica caused by increasing the pH and by eliminating divalent cations from the water allows concentrations in excess of the normal solubility limit of 150 ppm to be -maintained in the reject concentrate from the RO, with successful operation reported at 450 ppm silica and higher. As a result, the '319 application proposes that RO systems can be operated with significantly increased permeate recovery reported from 85 to 95% depending on levels of other contaminants in the water. Another major cost issue with the invention described in the '319 application is its poor performance on raw waters which contain a hardness to alkalinity ratio that is substantially less than one. Under such conditions, the capacity of the weak acid cation resin to remove the divalent hardness cations present is very poor as the resin can only remove divalent cations that are associated with alkalinity.

There is therefore a need in the art for additional or improved pretreatment methods and membrane systems that have a reduced size or cost compared to prior art methods (i.e., reduced set-up costs, reduced operational costs, and reduced costs associated with regeneration of the pretreatment material). It would be advantageous to provide a pretreatment method or membrane system that removes silica and/or other colloidal particulates. It would also be advantageous to provide a system that substantially reduces the Silt Density Index (SDI) value of the water.

SUMMARY OF THE INVENTION

The present invention provides a novel method and pretreatment system which protects the RO or NF membranes from fouling, deposits, or chemical precipitation, any of which can shorten the useful life of the membranes.

In one embodiment, the present invention comprises a method of purifying water comprising: a) pretreating the water by passing the water through a vessel containing a resin component, wherein the resin component comprises a highly macroporous resin having a substantial number of pores having a pore diameter in the range of 1,000 to 500,000 Angstroms and a crush strength or Chatillon value of at least 24 g/bead (710 μm bead diameter); and b) feeding the water exiting the resin component to a reverse osmosis membrane or a nanofiltration membrane to produce permeate water.

Another aspect of the present invention provides a method of treating water comprising: a) feeding water into a vessel containing a resin component, wherein the resin component comprises a highly macroporous resin with high porosity and high crush strength (i.e., having an average pore diameter range from 10,000 to 500,000 Angstroms and a crush strength or Chatillon value of at least 24 grams per bead); b) feeding the water from the resin component into a reverse osmosis system or a nanofiltration system to produce permeate water; and c) when chemical cleaning of the resin component is advised, regenerating the resin component using one solution of a single chemical or mixture of chemicals for simultaneous regeneration or rejuvenation of the resin component.

Another aspect of the present invention provides a method of treating water containing dissolved silica is provided, where the comprises: a) feeding water into a vessel containing a resin component, wherein the resin component comprises an iron-impregnant or iron-containing media which is an iron oxide attached to an ion exchange resin; b) feeding the water from the resin component into a reverse osmosis system, a nanofiltration system, a demineralization unit, a cooling tower, or a boiler; and c) when chemical cleaning of the resin component is advised, regenerating the resin component with an alkali solution or an alkaline and brine solution. Regeneration may be accomplished using one solution of a single chemical or mixture of chemicals for simultaneous regeneration or rejuvenation of the resin component. In one embodiment, the iron-impregnant media comprises ArsenX$^{np}$.

In one embodiment, the pore volume of the macroporous resin is at least 0.36 ml/g (dry). In another embodiment, the pore volume is 0.36-0.6 ml/g. In yet another embodiment, the pore volume is 0.36-1.5 ml/g.

In another embodiment, when chemical cleaning of the resin component is advised, the method also comprises regenerating the resin component using one solution of a single chemical or mixture of chemicals for simultaneous regeneration or rejuvenation of the resin component. In yet another preferred embodiment, the chemical regenerant is used more than once (i.e., at least two times, at least four times, or more).

In another preferred embodiment, the macroporous resin is sulfonated and comprises a strong-acid cation-exchange resin. In another preferred embodiment, the macroporous resin is chloromethylated and then aminated, wherein the macroporous resin comprises a basic anion-exchange resin.

In yet another preferred embodiment, the macroporous resin was formed from the polymerization of a solution of (a) a monoethylenic monomer, (b) a polyethylenic monomer, (c) a free-radical initiator, and (d) 20-40 pph poly(alkylene oxide) pore-forming agent or a mixture of the 20-40 pph poly(alkylene oxide) with toluene, pore forming agents. In one embodiment, the poly(alkylene oxide) is a copolymer of ethylene oxide and propylene oxide. In a preferred embodiment, the poly(alkylene oxide) is present from 20-33 pph.

In another embodiment, the macroporous resin has pore diameters ranging from 10,000 to 200,000 Angstroms. In another embodiment, the macroporous resin has pore diameters ranging from 10,000 to 200,000 Angstroms and a mean pore diameter (D50) of 31,000 to 70,000 Angstrom. In another embodiment, the macroporous resin has pore diameters ranging from 5,000 to 100,000 Angstroms.

In another embodiment, the macroporous resin has a crush strength or Chatillon value of 175 g/bead average to 475 g/bead average, or higher. In another embodiment, the macroporous resin has an average pore diameter in the range of 10,000 to 500,000 Angstroms, a pore volume of at least 0.60 ml/g (dry), and a crush strength or Chatillon value of at least 24 g/bead (i.e., an orthoporous resin). In another embodiment, the macroporous resin has a pore diameter in the range of 10,000 to 200,000 Angstroms, a pore volume of at least 0.60 ml/g (dry), and a crush strength or Chatillon value of at least 24 g/bead. In yet another embodiment, the macroporous resin has a pore diameter in the range of 5,000 to 100,000 Angstroms, a pore volume of at least 0.60 ml/g (dry), and a crush strength or Chatillon value of at least 24 g/bead to 175 g/bead.

In one preferred embodiment, resin component reduces the Silt Density Index (SDI) and/or the colloidal particulate content of the water by at least 25%. Preferably, the SDI is reduced by at least 50%. Even more preferably, the SDI is reduced by at least 75%. In one preferred embodiment, the SDI after step b) is less than 2.5. Even more preferably, the SDI after step b) is less than 2.0, and even more preferably, the SDI after step b) is less than 1.5.

In another preferred embodiment, the resin component further comprises an iron-impregnant or iron-containing media. Preferably, the resin component reduces the dissolved silica of the water treated by at least 20%. In a preferred embodiment, the iron-impregnant or iron-containing media is an iron salt. In another preferred embodiment, the iron-impregnant or iron-containing media is an iron oxide attached to an ion exchange resin.

In yet another embodiment, the resin component further comprises one or more strong base resins. Preferably, the resin component reduces the total organic carbon (TOC) content of the water treated by at least 20% or more, preferably 40% or even more preferably 60%. In a preferred embodiment, the resin component comprises two different strong base resins or a resin with two different strong base functional groups such as a BiQuat resin (a resin having two quaternary ammonium groups selected from triethylammonium, tripropylammonium, and trihexylammonium.

In yet another embodiment, the resin component further comprises a strong acid resin. Preferably, the resin component reduces the divalent cation content of the treated water by at least 20%.

In yet another embodiment, step b) removes contaminants from the water and these contaminants include at least two of: colloidal particulates having a diameter of at least 8 nm, dissolved organic matter, dissolved divalent or trivalent metal cations, dissolved sulfate or arsenate, and dissolved silica or phosphate. More preferably, at least three contaminants are removed.

In another embodiment of the present invention, the method of purifying or treating water further comprises pressurizing the water entering the vessel containing the resin component to pressure values ranging from 5 to 200 pounds per square inch by means of a pressure pump. In yet another embodiment, the water pressure during step b) is at least 5 pounds per square inch and the flow rate through the vessel allows for at least 8 to 20 gallons per square foot flow through the reverse osmosis membrane or a nanofiltration membrane surface per day.

In a preferred embodiment, the step of regenerating comprises recirculating the chemical regenerant by recovering the effluent from the vessel containing the resin component and re-introducing it to the vessel to make repeated passes through the resin component.

In a preferred embodiment, the chemical regenerant comprises a solution of a chloride ion, an alkali bases, or a mixture of a chloride salt and an alkali base. In another preferred embodiment, the chemical regenerant comprises a mixture of sodium chloride and caustic soda. In yet another preferred embodiment, the chemical regenerant is used more than once (i. e., at least two times, at least four times, or more).

In yet another embodiment, the resin component further comprises at least one of polystyrene or acrylic polymer matrix-based anion exchange resin; an iron-impregnant or iron-containing media such as an iron salt or an iron oxide attached to an ion exchange resin; or a strong acid cation exchange resin.

In anther preferred embodiment, the average reduction in dissolved silica of the effluent water compared to the water fed into the vessel is at least 20%. In anther embodiment, the water fed into the vessel has at least 1 ppm silica. In yet another embodiment, the water is fed into a demineralization unit in step b) and wherein the chemical regenerant of step c) is a caustic solution effluent from the anion vessel of the demineralizer.

In yet another embodiment, the method of purifying or treating water further comprises pressurizing the water entering the vessel containing the resin component to pressure values ranging from 5 to 200 pounds per square inch by means of a pressure pump. In yet another embodiment, the water pressure during step b) is at least 5 pounds per square inch, and the flow rate through the vessel allows for at least 8 to 20 gallons per square foot flow through the reverse osmosis membrane or a nanofiltration membrane surface per day. In a further embodiment, the water is fed into a boiler in step b) which is operating at over 800 psi.

In another embodiment, the water is fed into a demineralization unit in step b), wherein the resin component further comprises a strong base resin.

In yet another embodiment, the regenerant may be recirculated by recovering the effluent from the vessel containing the resin component and re-introducing it to the vessel to make repeated passes through the resin component.

Another aspect of the present invention comprises a water treatment system using the resins as described herein and one or more of a polystyrene or acrylic polymer matrix-based anion exchange resin; an iron-impregnant or iron-containing media; or a strong acid cation exchange resin in fluid connection to a reverse osmosis membrane or a nanofiltration membrane, wherein the resin component can be regenerated using a single chemical regenerant solution.

DETAILED DESCRIPTION

Resin Component

Figure 1:
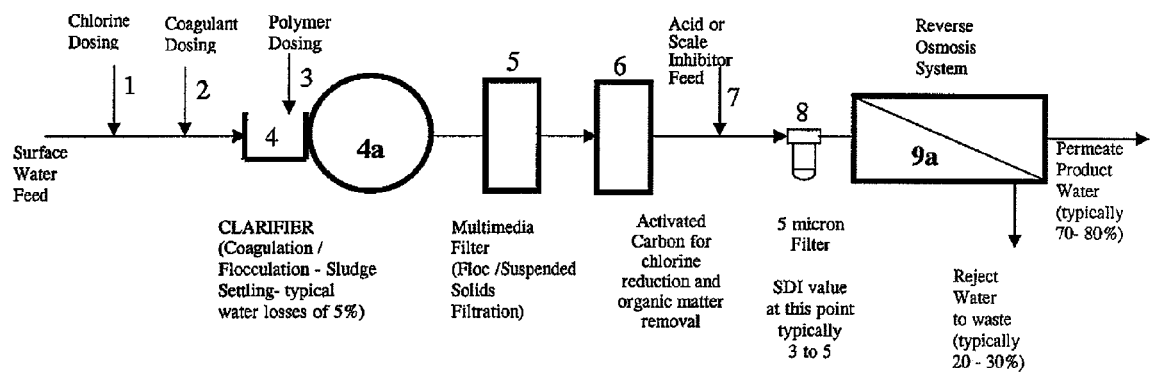
FIG. 1 shows a flow sheet of a typical conventional pretreatment system for reverse osmosis membrane systems utilizing surface water as feed.

The present invention comprises a resin component which is a highly macroporous resin that can be used for the pretreatment of water being fed to a membrane treatment system. The membrane treatment system may be a reverse osmosis membrane system or a nanofiltration membrane system. This resin component contains one or more ion exchange resin and/or adsorbent media layered or mixed together in an ion exchange vessel. In some embodiments, the resin component can be described as a multi-contaminant control mixture since multiple contaminants are removed from the water stream by the resin. These contaminants include, but are not limited to, colloids, dissolved organic matter, dissolved silica, and divalent and trivalent cations. As used herein, the resin component may also include adsorbents.

The resin component is effective for the simultaneous removal or reduction in concentration of one or more of the following contaminants from a water supply or process stream:

i. Colloidal particulates ranging in diameter from 0.008 micron (80 Angstroms) and greater consisting typically of colloidal species of silica, organic matter, iron, manganese, aluminum, copper, lead, nickel, and other metals;

ii. Dissolved organic matter (naturally occurring organic matter such as humic, fulvic and tannic acids);

iii. Dissolved divalent or trivalent metals cations such as calcium, magnesium, barium, strontium, iron, manganese, aluminum, copper, lead, and nickel;

iv. Dissolved anionic species including sulfate and bicarbonate; and v. Dissolved silica, phosphate, arsenate, and similar oxyanions.

Preferably, two or more of the above contaminants are reduced or removed. Even more preferably, three or more of the above contaminants are reduced or removed. Even more preferably, four or more of the above contaminants are reduced or removed. Most preferably, five or more of the above contaminants are reduced or removed. The number of contaminants removed by the resin component will depend on the identity and concentrations of contaminants in the raw water, and the other elements in the water purification system being used, such as a pretreatment filter.

In one embodiment, a single porous resin that reduces or removes colloidal contaminants is used.

In an embodiment, the resin component comprises a porous resin to reduce or remove colloidal contaminants and a strong base resin that removes dissolved organic contaminants.

In another embodiment, the resin component comprises a porous resin to reduce or remove colloidal contaminants, a strong base resin that removes dissolved organic contaminants, and an adsorbent media that removes dissolved silica. Two or more of the resins may have been previously combined, such as a resin combining organic removal and removal of colloidal contaminants.

In another embodiment, the resin component may contain two or more strong base resins. In anther embodiment, the resin component contains a strong acid component as a softener resin.

As used herein, the phrase "reduces contaminant" means that at least 25% of the measurable contaminant (or contaminants) is removed from the water stream. More preferably, at least 40% of the contaminant is removed. More preferably, at least 60% of the contaminant is removed. Even more preferably, at least 70% of the contaminant is removed, and even more preferably, at least 80% of the contaminant is removed. Most preferably, at least 90% or more of the contaminant concentration is removed when comparing the contaminant concentration in the inlet of the vessel or device compared to the outlet of the vessel or device.

As used herein, the phrase "removes contaminant" means that at least 95% of the measurable contaminant (or contaminants) is removed from the water stream. More preferably, at least 98% of the contaminant is removed. Even more preferably, at least 99% of the contaminant is removed, and even more preferably, at least 99.5% of the contaminant is removed. Most preferably, at least 99.9% or more of the contaminant concentration is removed when comparing the contaminant concentration in the inlet of the vessel or device compared to the outlet of the vessel or device.

As used herein, the terms "diameter" and "size," when referring to colloids, are both defined as the average diameter of the colloidal particles.

The resin component is also effective for reducing the Silt Density Index (SDI) value of the water or process stream in preparation for treatment of the water by a reverse osmosis, nanofiltration, or similar membrane system. The SDI value is a numeral value derived from a standard industry test in which the flowing sample of feed water to be tested is kept at a constant pressure of 30 psig and is passed through a 0.45-micron filter element. The time taken to fill a standard 500 ml container is recorded for an initial reading taken immediately at the beginning of the test and another reading taken 15 minutes after. A mathematical formula is used to compare and compute a numerical value referred to as the Silt Density Index (SDI) value. Numerical values range from 1 to 7, with 1 being excellent and representing minimum fouling, while increasing values represent rapidly deteriorating fouling conditions. The typical percentage of reduction of the SDI value of a water stream passing over the resin component ranges from 25% to 100%. Preferably, the SDI is reduced by at least 40%. Even more preferably, the SDI is reduced by at least 50%, and even more preferably, the SDI is reduced by at least 60%. Even more preferably, the SDI is reduced by at least 70%, and even more preferably, the SDI is reduced by at least 80%. Even more preferably, the SDI is reduced by at least 90%, and most preferably, the SDI is reduced by at least 95%.

In a preferred embodiment, the resin component uses a combination of two or more of:
i. a macroporous resin with high porosity and high crush strength, primarily for removal of colloidal particulates and some dissolved organic matter;
ii. a strong base or weak base anion exchange resins of polystyrenic or acrylic polymer matrix primarily for removal of dissolved organic matter and anionic species such as sulfate and bicarbonate;
iii. an iron-impregnated or iron-containing media using substrates such a cation or anion resin, alumina, natural zeolite, sand or similar filtration media primarily for the removal of dissolved silica, arsenic, phosphate and similar oxyanions by an adsorption mechanism; and
iv. a strong acid cation exchange resins primarily for removal of dissolved divalent or trivalent metals cations such as calcium, magnesium, barium, strontium, iron, manganese, aluminum, copper, lead and nickel.

In a preferred embodiment, the resin component comprises a combination of a macroporous resin with high porosity and high crush strength and one or more of ii, iii, and iv.

Macroporous Resin of High Porosity and High Crush Strength

In one embodiment, the macroporous resin used as part of the resin component is a colloidal scavenger resin with high porosity and high crush strength such as described in U.S. Pat. No. 6,323,249 to Dale, et al., herein incorporated by reference. The diameter of the large macropores in this resin typically range from 5,000 to 100,000 Angstroms, or more preferably 10,000 to 200,000 Angstroms and are ideal for removal of colloidal particulates by a combination of adsorption and ion exchange phenomena. Preferably, the mesh size of this resin is 16 to 50 U.S. mesh. Either cation or anion type resins can be utilized as the base resin. When using an anion resin as the base, the capacity for removal of dissolved organic matter is increased significantly. The synthesis of the macroporous resin of the present invention is described herein below.

The macroporous resin also has a pore volume of at least 0.36 ml/g (dry). The pore volume may be greater than about 0.6 ml/g dry, or the pore volume may be between 0.36 and 1.5 ml/g dry.

The macroporous resin has a high crush strength, which is defined as a Chatillon value of at least 24 g/bead (710 μm bead diameter). More preferably, the Chatillon value is at least 50 g/bead, and even more preferably at least 100 g/bead. More preferably, the Chatillon value is a least 200 g/bead. The high crush strength is an important aspect of the present invention since resins having lower crush strength have the disadvantage that, due to the need to contain and operate the resins in pressurized vessels and the need to subject the beads to repeated exhaustion and regeneration cycles, the beads tend to fracture. Potentially the fractured bead then can be eluted from the vessel and foul the membrane filter; the efficacy of the remaining resin is also reduced for resins having lower crush strength.

In another embodiment, the macroporous resin used as part of the resin component is an orthoporous resin with high porosity and high crush strength such as described in U.S. Provisional Patent Application No. 60/908,172, herein incorporated by reference. The orthoporous resins used in the present invention have particularly large pores compared with typical macroporous resins. The pore size affects the diffusion and flow kinetics through the resin material. The orthoporous resins can be formed by generating an interpenetrating polymeric network (IPN). This is done by (a) preparing an initial macroporous copolymer, (b) re-swelling, and (c) polymerizing. When an orthoporous resin is used, the average pore diameter is between about 10,000-500,000 Angstroms.

The orthoporous resins of the present invention are formed in several steps. A first step involves the synthesis of a copolymer by (a) suspending droplets of a homogeneous mixture of monomers with a free radical initiator and porogen(s), such as an aliphatic alcohol—i.e., methyl isobutyl carbinol, isobutyl alcohol, etc.—(b) in an aqueous solution, and then (c) thermally polymerizing. A second step involves combining (re-swelling) the $0^{th}$ order IPN, as made in the first step, with another monomer mixture and polymerizing in aqueous suspension, to create a $1^{st}$ order IPN. A third step combines the $1^{st}$ order IPN with additional monomer, to create a $2^{nd}$ order IPN. In one embodiment, a $3^{rd}$ order IPN is formed by using the $2^{nd}$ order IPN as a seed.

Preferably, the mixture of polymerisable monomers used to form the copolymer and to form the IPN comprises a monoethylenically unsaturated monomer, or monomers, and a polyvinylidene monomer. Initiators, suspension agents, stabilizers, etc. may be added to the monomer mixture or aqueous phase as appropriate.

One preferred macroporous resin is formed when styrene, divinylbenzene and a porogen are mixed together with a polymerization initiator to form the monomer solution. Free radical initiators are most desirable. Free radical generating compounds which may be used to effect polymerization of the monomers include peroxides such as benzoyl peroxide, lauoryl peroxide, tertiarybutyl peroxide, peroxy-compounds such as potassium persulfate, sodium perborate and ammonium persulfate and azo compounds such as azo-bisisobutyronitrile, 2,2-azobis-(2-methyl-butyronitrile), 2-t-butylazo-2-cyano propane. Suitable concentrations are from 0.01 to 5.0%, more preferably 0.02 to 3.0%. The monomer phase is added to an aqueous phase for suspension polymerization of the monomers. Salt may be added to the aqueous phase to decrease the water solubility of the monomers.

Various suspension agents and stabilizers such as polyvinylalcohol, methyl cellulose, carboxymethyl cellulose, hydroxyethyl cellulose, poly(vinyl pyrrolidine), polyacrylate salts, polymethyacrylate salts, dimethyldialkylammonium polymers, nitrite and dichromatic salts, calcium phosphate salts, carbonate salts, sulfate salts, bentonite clays, gum arabic, lignosulfonates, gelatine and xanthan gums in amounts ranging from 0.01 to 1.0% by weight of the monomers may be added to the aqueous dispersion to aid in maintaining the monomers dispersed as droplets while polymerizing the same as beads.

Orthoporous copolymers can be sulfonated with sulfuric acid, oleum, sulfur trioxide, or chlorosulfonic acid to form a cation exchanger or, alternatively, it may be chloroalkylated and subsequently aminated to form an anion exchanger.

A wide variety of amines including primary, secondary, and tertiaryalkylamines, or arylamines can be employed in the amination reaction. Polyalkylenepolyamines such as ethylenediamine, diethylenetriamine, triethylene-tetramine, tetraethylenepentamine, propylenediamine, and iminobispropylamine can also be used. Aminoalcohols and dimethylaminoethanol are also useful, as well as hexamethylenetetraamine. A preferred embodiment employs a trialkylamine as the aminating agent, producing a quaternary anion exchanger. Generally, the alkyl radical does not contain more than 4 carbon atoms.

In some embodiments, a strong base anion exchange using a trimethylamine resin is preferred. Weak base anion exchange resins may also be prepared; these resins are prepared in the same manner as the strong base resins with the exception that the tertiary-amine is replaced with non-tertiary amines, such as dimethylamine, diethylamine, monomethylamine, ethanol amines, etc.

The macroporous resin described in this embodiment of the invention has a particularly high crush strength. Thus, in one embodiment, the Chatillon value is at least 200 g/bead average (710 µm bead diameter). More preferably, the Chatillon value is at least 300 g/bead. More preferably, the Chatillon value is a least 400 g/bead. In one embodiment, the crush strength is 475 g/bead. The high crush strength is an important aspect of the present invention since resins having lower crush strength have the disadvantage that, due to the need to contain and operate the resins in pressurized vessels and the need to subject the beads to repeated exhaustion and regeneration cycles, the beads tend to fracture. Potentially the fractured bead then can be eluted from the vessel and foul the membrane filter; the efficacy of the remaining resin is also reduced for resins having lower crush strength.

Iron-impregnated or Iron-containing Media

Optionally, an iron-impregnated or iron-containing media may be incorporated in the resin component. Granular iron oxide or iron hydroxide based adsorbents have been marketed for a number of years for arsenic removal and show a good capacity for dissolved silica adsorption, and may be used in the resin component of the present invention. However, many popular products based primarily on pure iron oxide or hydroxide have a tendency to break down generating fines which can then foul downstream equipment. Therefore, preferred iron-impregnated or iron-containing media useful in the present invention includes iron-impregnated cation and anion resins such as ArsenX$^{np}$ (manufactured by The Purolite Co., Philadelphia) as described in U.S. Pat. No. 7,291,578 and Resintech ASM-10HP (manufactured by Resintech, New Jersey) as described in U.S. Patent Publication 2006/0037913 herein incorporated by reference. During manufacture of ArsenX$^{np}$ resin, nanoparticles of iron oxide are deposited deep within the matrix of the resin beads. The resin beads provide a robust matrix to which the nanoparticles are firmly bonded and allow efficient diffusion of water and its contaminants into and out of the beads. Thus instead of adding iron salt to the silica containing water to treat silica in thermal brines, the silica-containing water is simply passed through a bed of the iron-containing impregnated media, allowing the silica to diffuse into the matrix of the iron-impregnated resin to become complexed by adsorption onto the nanoparticles of iron oxide.

While ArsenX$^{np}$ resin was primarily developed for removal of arsenic and other oxyanions by adsorption, it shows good capacity for silica removal, like other iron-based adsorbents, but without the physical breakdown issues of granular products. Indeed, water treatment practitioners initially recognized the adsorption of silica by such iron-containing products during the removal of arsenic from drinking water systems. But to practitioners its ability to remove silica was viewed as merely providing undesirable competition to the adsorption of arsenic from the water since, depending on the water chemistry, ArsenX$^{np}$ resin typically shows adsorption capacities for silica of only about 1000 to 2000 bed volumes of water treated versus typical arsenic capacity of as much as 40,000 to 100,000 bed volumes. Therefore, the capacity of ArsenX$^{np}$ resin for silica has previously been viewed as more of a nuisance contaminant since the silica competed with arsenic, the contaminant of interest, for the same adsorption sites on the media. A proprietary method of regeneration of ArsenX$^{np}$ resin is available for stripping or eluting silica, phosphate, and arsenic from the media, utilizing simple brine and caustic solution consisting usually of 2% caustic and 1% brine. Heating the solution, preferably to temperatures up to 50° C., and passing 2-20 bed volumes, preferably approximately 6 bed volumes, slowly through the resin bed at a flowrate of about 2 bed volumes per hour increases the removal efficiency of silica and the other contaminants. Although ArsenX$^{np}$ can be used and disposed of after a single use, in a preferred embodiment, it is regenerated repeatedly after exhaustion and reused multiple of times before final disposal. This embodiment is desirable due to the lower overall cost. Therefore, ArsenX$^{np}$ resin is a preferred component in the resin component for processes where the raw water stream contains dissolved silica, especially at elevated concentrations. Iron-impregnated or iron-containing media having an iron oxide attached to an ion exchange resin where the ion exchange resin has a crush strength of at least 24 g/bead (and preferably higher) can be used for removal of dissolved silica in various systems that, because of the pressure requirements, do not allow for use of crushable medias. These systems include reverse osmosis systems, nanofiltration systems, demineralization units, cooling towers, boilers, etc.

The resin component may contain, for example, a macroporous resin of high porosity and high crush strength, a strong base anion exchange resin, and ArsenX$^{np}$ resin. The resin component may contain two or more components from a single category. For example, it may contain two strong acid cation exchange resins for the removal of different metal cations. These components may be homogeneously mixed or formed into layers within the vessel containing the resin component. Other configurations of the components are also envisioned.

The resin component must be able to withstand the pressure applied to the vessel without crushing. The crush strength of the macroporous resin within the resin component must be at least 24 g per bead average. More preferably, the crush strength is at least 50 g per bead. More preferably, the Chatillon value for the macroporous resin is a least 100 g per bead. Even more preferably, the Chatillon value for the macroporous resin is a least 200 g per bead average.

Other components in the resin, which will add to the overall crush strength, must also be stable to crushing. Preferably, the resin component, which contains a macroporous resin and optionally other resins or absorbent components, has high crush strength, defined as a Chatillon value of at least 24 g per bead. More preferably, the Chatillon value for the resin component is at least 50 g per bead. More preferably, the Chatillon value for the resin component is a least 100 g per bead. Even more preferably, the Chatillon value for the resin component is a least 200 g per bead. Commonly-used ion exchange resins such as strong-acid cation exchange resins and basic anion-exchange resins have crush strengths significantly greater than what is defined herein as a "high" crush strength. The adjective "high" is used, herein, to mean in comparison to other large-pore macroporous resins capable of adsorbing colloidal materials, and not all available or common resins without regard to their porosity.

Advantages

The resin component allows for the use of a smaller size RO membrane system for treating the same flow-rate of water compared to conventional systems; reduction in SDI by the methods and system of the present invention to values lower than 2 units, allows for design at a flux rate of 14 to 18 gallons per square foot of membrane surface per day (GFD) compared to the allowable flux of 8 to 14 GFD when SDI values exceed 2 units (see Hydranautics Design Limits, www.hydranautics.com/docs/trc/Dsgn_Lmt.pdf). Thus, the number of membranes needed and the size of the membrane system needed is thus reduced.

There is significantly lower wastage of water using the methods and systems of the present invention. The wastage is typically less than 1%, such as water used for periodic regeneration of the resin component compared to on-going backwash and flushing water needs of UF systems ranging from 5 to 15%.

The use of the resin component in the methods and systems of the present invention also allows for the reduction in the number of unit operations or treatment steps needed compared to conventional treatment systems and in associated labor and operating costs.

Additional benefits include a lower capital cost when compared to conventional and UF pretreatment systems, a reduced footprint requirement compared to conventional treatment systems, and the removal or reduction of contaminants that are not addressed by the conventional or UF pretreatment systems such as removal or reduction of dissolved sulfate, arsenate, phosphate, and similar oxyanions.

An advantage of the method and system described in the present invention is the compact size available for the vessel containing the resin component. The resin component can use regenerable ion exchange/adsorbent resins layered or mixed together in a compact ion exchange vessel. The ability to use a vessel having a small footprint allows for lower cost vessels and smaller space requirements for the purification system without reducing the flow rate of the water in the system.

Another advantage of the method and system described in the present invention is the lower cost associated with operating the purification process. In previous pretreatment methods, an operator was generally required to oversee the process. For example, a conventional hot lime softener/clarifier used to reduce silica contamination requires heating the water, a large space, and skilled operators to continuously monitor and adjust chemical feed. Similarly, the purification technology described in US Patent Application 2002/0153319 requires a number of costly pretreatment steps including use of two weak acid cation vessels in series, one operating in the hydrogen form and the other in the sodium form, along with a decarbonator vessel to release $CO_2$ generated by the hydrogen form weak acid cation vessel. These units require on-going skilled operator attention on a daily basis for acid and caustic chemical handling and control, water sampling and testing. In contrast, the resin component does not require significant operator oversight.

Contaminants

Surface waters typically have elevated levels of suspended solids with turbidity values greater than 1 nephelometric turbidity units (NTU) and dissolved organic matter consisting largely of humic and fulvic acid compounds at concentrations of several parts per million. Present in most of these surface waters are varying levels of colloidal particulates comprised of silt, clay, silica, iron, aluminum and organic matter. As a result, surface waters typically have Silt Density Index values greater than 5. Typical concentrations of colloidal silica range from 0.2 to 3 ppm. The resin component of the present invention is particularly useful in removing these contaminants such that the fouling, chemical deposits, and chemical precipitation on the RO membrane are reduced.

Silica Removal

The resin component of the present invention is particularly useful in removing silica. Removal or reduction of dissolved silica in the feed water has always been of major interest in RO purification. Silica has a solubility of approximately 150 mg/l at ambient temperatures and can form difficult to remove deposits on the membrane surfaces if its solubility limit is exceeded in the reject/concentrate wastewater stream from RO system. Thus the higher the influent silica, the more reject water must be wasted. In fact, the need to prevent silica deposits and biological fouling are, in part, the major reasons for the large percentage of reject water from the typical RO system, ranging generally from 20 to 30%. For waters with high silica (i.e., 30 to 70 ppm, or higher), this can be especially problematic, requiring the generous dosing of silica dispersant chemicals ahead of the RO and inefficient design for even higher rates of water rejection, approaching 50% or more. Vendors of silica dispersants generally claim success in controlling silica at about 200 percent of saturation, but membrane manufacturers usually set their own internal alarm point at 100% of saturation to minimize silica deposits (see Hydranautics—Chemical Pretreatment for RO and NF—March 2002), http://www.membranes.-com/docs/tab/TAB111.pdf. Cleaning membranes for silica deposits which tend to be hard and crust-like can be very costly in terms of downtime, the expensive chemicals that are needed, and the risk of permanent damage and shortened life of the membranes.

Silica can be partially removed from surface waters in conventional hot lime softeners/clarifiers in which the silica is co-precipitated with magnesium hydroxide to form sludge. Such systems have not enjoyed widespread use however, since they are generally limited to large plants due to the requirements including heated water, a large space, and the need to continuously monitor and adjust the chemical feed. In addition, the exiting pH of the treated water, usually over 10, must be adjusted downward by acid addition to avoid post-precipitation of solids and to avoid damage to the RO membranes. In helping to solve the dissolved silica problem, the potential for fouling by colloidal particulates is increased as such systems have a tendency to retain colloidal and suspended solids in the carryover from the hot lime softener. The typical downstream multimedia can do a good job of removing suspended solids but has only minor capability to remove colloidal particulates, leaving the possibility of intolerable fouling of the membranes.

Silica removal on iron oxide is a long established technology that has been used in purification of hot thermal brines, where an iron salt such as ferric chloride is used to form a sludge of iron oxide/hydroxide on which silica present in the brine is allowed to precipitate and is then filtered out. The formation of an iron/silica sludge creates a similar problem to that formed with the hot lime softener, i.e., the difficulty of efficiently filtering out suspended and colloidal solids before the water reaches the reverse osmosis membranes.

The resin component of the present invention can be used to reduce dissolved silica in the feedwater to the membrane system, allowing a potential for recovery of a higher percentage of the water as permeate (approaching 85 to 95 percent), and thus requiring much less water to be wasted as reject. Silica in the reject stream must be controlled at no more than 150 ppm to avoid precipitation on the membrane surfaces. So for example, if the influent water had a silica content of 50 ppm, silica in the reject water can only be concentrated 3 times (i.e. 150/50) so as not to exceed the 150 ppm limit; this equates to a rejection volume of ⅓ or approximately 33% of the water (if the small amount of silica leakage in the permeate is ignored). So permeate recovered is about 66%. If however, the silica were reduced to say 25 ppm in the influent water, the reject can now be concentrated to 6 times (i.e. 150/25); this equates to a much reduced reject water volume of approximately ⅙th of the total influent water or about 16.7 percent. Thus the percentage recovered as permeate increases to about 83%). Using this example, it can be seen that the volume of useful permeate increased by over 25% compared to the initial level, while the reject water volume decreased by 50% of its initial levels. Any throughput fees relevant for disposal of the reject water would be expected decrease by 50% while any revenues from sale of the permeate would increase by over 25%.

Analysis of Resin Pore Structure and Crush Strength (Friability)

The pore structure of macroporous resins is formed by voids or channels between the polymer lattice work. The pore structure has been found to have a characteristic pore distribution and range. Numerous methods of pore measurement have been applied to macroporous resins; none are truly absolute. Characterization by the mercury-intrusion technique, particularly within a series, has been found to be direct, reproducible, and consistent. The mercury-intrusion method has long been used to find the distribution of sizes of capillary pores in a porous solid by forcing in mercury, the radius being found from the pressure and the percentage from the volume of mercury absorbed at each pressure. The method is based on the relationship that the pressure required to force pure mercury into a capillary of diameter d is $(-4 \sigma \cos \theta)/d$, where $\sigma$ is the surface tension of mercury and $\theta$ is the contact angle of mercury with the porous solid (Proc. Nat. Acad. Sci. U.S.A. (1921) 7:115). Since, for a particular solid the surface tension and the contact angle are constants, penetration of mercury into the pores, at a known pressure, indicates the corresponding pore diameter while the amount of mercury intruded, indicates the porosity or volume of pores of a given diameter.

As used herein, the term "crush strength," refers to the mechanical load required to break individual resin beads, and is used interchangeably with the term "friability." Crush strength is the statistical average of the individual crush strengths of a sample comprising at least 10 but generally 25 beads, each bead having a particle diameter of 710 µm±35 µm, wherein crush strength is the applied force at which the bead snaps or crushes.

The crush strength of the macroporous resin of the present invention, when the resin has been aminated to form a strong base anion exchange resins is at least about 24 g/bead preferably at least 30 g/bead, more preferably at least 40 g/bead, and even more preferably at least 50 g/bead. Similarly, the crush strength of the macroporous resin which has been formed into a strong acid-type cation exchange resins (i.e., sulfonic acid groups, e.g. sodium polystyrene sulfonate or polyAMPS), other strong base resins (i.e., trimethylammonium groups (i.e., polyAPTAC) weak acid resins (i.e., carboxylic acid groups), and weak base resins (i.e., amino groups, such as polyethylene amine).

Crush strength can be measured using the Chatillon test. The Chatillon test is named for an apparatus manufactured by John Chatillon and Sons, New York, N.Y. and designed to measure resin friability. This instrument measures the force (grams) required to crack or fracture a resin bead when it is placed between two parallel plates. The plates are gradually brought together at a uniform rate until the resin "breakpoint" is reached. The purpose of this test is to simulate the frictional and pressure forces exerted on individual resin beads under actual use conditions.

Specifications for testing include converting the resin into the proper form (hydrogen or sodium for cation resins and chloride form for anion resins) by well known standard procedures. The converted resin is screened to a −20+30 U.S. mesh cut size and then allowed to fully hydrate in deionized water for at least 15 minutes prior to testing. Actual testing is done on a single resin bead (covered by a small drop of water) in the Chatillon instrument using the lowest practical speed of descent of the crushing plate. The individual fragmentation forces are recorded from the instrument in grams per bead and the results are presented as an average (20 beads minimum, typically 30 beads), a standard deviation, a 95% confidence interval, and the percentage of beads which meet a minimum friability standard.

Analysis of Treatment Efficacy

The propensity of a membrane to become fouled by particulates in the feed water can be determined using a standard test called the Silt Density Index (SDI). In this test, a sample of the feed water is passed through a 0.45-micron filter and a measurement is taken of how fast the filter becomes fouled. From this, an SDI value is calculated. Typical values range from 1 to 6. A high value means the water presents a high fouling risk. Membrane suppliers generally require an SDI value of no more than 4 if a performance guarantee is to be given, and generally prefer that the SDI value be no greater than 3. Properly designed conventional pretreatment systems generally achieve values below 5 and may sometimes achieve values or 3 or lower. A common indicator of suspended solids particles present in the water is turbidity, measured in units referred to as Nephelometric Turbidity Units (NTU). NTU are defined as the intensity of light at a specified wavelength scattered or attenuated by suspended particles or absorbed at a method-specified angle (i.e., 90°) from the path of the incident light compared to a standard. Most RO designers specify a maximum turbidity of 1 NTU. For long term, reliable operation, maximum values of SDI and Turbidity of 2.5 SDI units and 0.5 NTU respectively are preferred.

In the present invention, the SDI of water exiting the vessel containing the resin component is less than 4. More preferably, it is less than 3.5, even more preferably, it is less than 3, and even more preferably, it is less than 2.5. In a preferred embodiment, the SDI is less than 2.0, and in an even more preferred embodiment, the SDI is less than 1.5, and in an even more preferred embodiment, the SDI is less than 1.0. Another method of analyzing the SDI is provided in a ratio of the SDI values for influent and effluent water of the vessel.

Cleaning

An advantage of the resin component of the present invention is the simplicity of regeneration. This is found through the time saving, reduced operator costs, and in many cases, reduced cost of regenerant(s). Using a single volume of chemical regenerant, such as a mixture of sodium chloride and caustic soda, all ion exchange resins and/or adsorbent media within the resin component are simultaneously regenerated or rejuvenated. The single regenerant is applied either at ambient or elevated temperatures up to 100° C.

In one embodiment, the chemical regenerant comprises a mixture of chloride salts, such as potassium, calcium or ammonium chloride, and an alkali or base, such as caustic potash, ammonium hydroxide, sodium carbonate, potassium carbonate, ammonium carbonate, and sesquicarbonates of sodium or potassium.

In another embodiment, the regenerant chemical comprises a chloride brine solution.

In another embodiment, the regenerant chemical comprises an alkali base.

The resin component may be cleaned on a once-through basis. In this embodiment, the regenerant mixture is passed once through the vessel containing the resin component and is then disposed of. Preferable flow rates range from 2 to 8 bed volumes per hour, a bed volume being defined as the equivalent liquid volume occupied by the combined volume resins and adsorbents in the vessel; even more preferred are flowrates ranging from 2 to 4 bed volumes per hour.

Using one regenerant mixture to regenerate all resins and adsorption medias results in savings on costs for regenerant, labor, associated dilution and rinse water, and waste water disposal costs including any chemical cost for neutralization of the alkali nature of the waste to comply with discharge regulations.

In addition, the regenerant mixture may be re-used to regenerate the resin component in subsequent regenerations. In one embodiment, a single regenerant mixture is used 2, 3, 4, 5, 6, 7, 8, 9, 10 or more times to clean the resin component when chemical cleaning is advised. Additional fresh chemicals may be added to the regenerant mixture for the subsequent regenerations to make up for any unavoidable losses to maintain the original concentration of the regenerant. While it is understood that re-using the regenerant mixture a certain number of times is not required each time it is advised to regenerate the resin component, it is noted that a greater ability to reuse the regenerant mixture allows for substantial cost saving.

The ability to repeatedly reuse the regenerant mixture very significantly reduces the cost associated with operating the resin component system, including cost savings in chemical regenerant, associated labor, waste water disposal fees, and any chemicals needed to neutralize the alkali waste to comply with discharge regulations.

In another preferred embodiment the chemical regenerant is repeatedly recirculated through vessel containing the resin component, collecting the eluent from the vessel and using a pump to return the solution to the inlet of the vessel to again pass through the bed or volume of resin, and then repeating this procedure multiple of times. Preferred rates of recirculating the chemical regenerant are from 2 to 40 bed volumes per hour, with a more preferred rate ranging from 8 to 40 bed volumes per hour. Recirculation at higher rates than normally used in the single pass method of the recirculation allows for considerable savings in time, as well as savings in associated labor cost, and the operating flexibility to minimize the time during which the resin component vessel is unavailable for processing of the feed water to the membranes.

Conventional methods of regeneration do not use the recirculation method of regeneration, as it is counter-intuitive in that the effluent containing contaminants eluted or stripped from the resin are essentially reintroduced to the resin on reintroducing the regenerant. Conventional single pass of the regenerant is designed to progressively strip the contaminants from the resin as the regenerant travels through the resin bed from one end to the other. As more fresh regenerant displaces the spent regenerant, the overall fraction of contaminants stripped from the resin into the regenerant continuously increases, allowing greater and greater efficiency of stripping the contaminants. The fraction of the contaminants left on the resin attains chemical equilibrium with the fraction extracted by the regenerant; a similar chemical equilibrium exists for the chemical regenerant, with the regenerant essentially displacing the contaminant from the resin in proportion to the selectivity of the resin for the contaminant and the regenerant.

Demineralization of water is a reference base for the ion exchange process in which 95 to 99 percent of the dissolved solids present in the raw water must be removed. Similarly softening of water by ion exchange for use as boiler feedwater or for supply to RO systems requires removal of hardness to very low levels of about 1 part per million, typically representing about 99 percent removal from the raw water. For such processes, it is intolerable to reuse or recirculate the regenerant if such quality is to be consistently achieved. Therefore, the embodiments comprising reuse and/or recirculation of the regenerant are not applicable to aspects of the invention in which strong acid cation resins in the sodium form are utilized for removal of divalent and trivalent cations, such as calcium and magnesium when softening for RO is required. However, the reuse and/or recirculation of the regenerant is appropriate for cases in which the resin component includes resins and/or adsorbents for the removal of dissolved silica, colloidal silica, and organic matter. In such cases, the concentrations and quantities of alkali and brine used for regeneration represent a very large excess over stoichiometric requirements (a few hundred percent), and in such cases the percentage of contaminants removal achieved by the present invention (typically 25 to 75%) do not require the highest purity of regenerant to be used to achieve the targeted level of quality. In addition, extraction of silica from the resin component is greatly facilitated by the very high solubility of silica in a caustic soda solution (greater than 25 percent). Reuse of the regenerant is preferred embodiment of the invention as the operating cost of the resin component system can be reduced to a small fraction of the cost compared to using the regenerant just once, thus providing even more cost savings benefits over conventional pretreatment systems.

General Description of Embodiments

Figure 2:
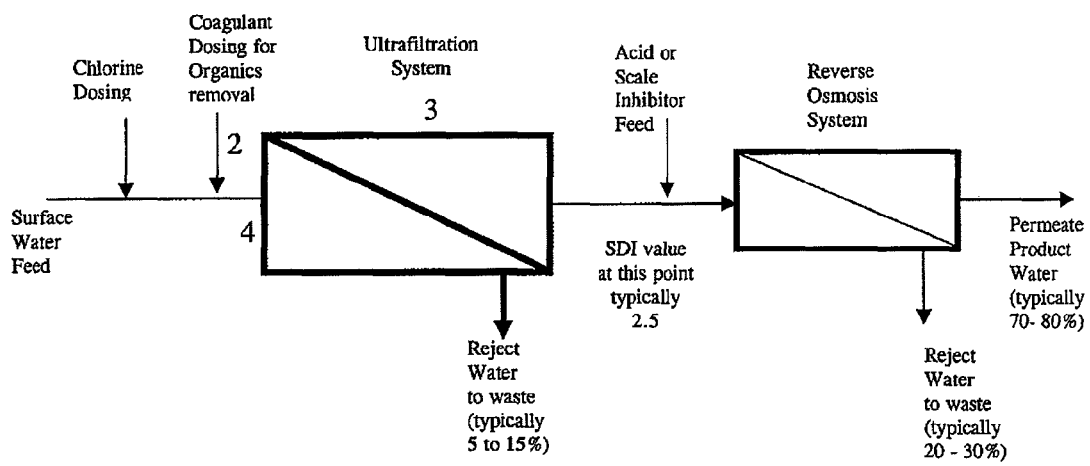
FIG. 2 shows a flow sheet of a second conventional typical pretreatment system for reverse osmosis membrane systems using an ultrafiltration membrane utilizing surface water as feed.

FIG. 1 shows the conventional pretreatment approach, utilizing a clarifier, multimedia filter, and carbon filter while FIG. 2 shows the use of a UF membrane system as pretreatment. The conventional system, such as the one described in FIG. 1, is labor intensive, subject more to operator error, and occupies a large footprint. The UF pretreatment unit, such as the one described in FIG. 2, is capital intensive and itself wastes significant amounts of water in addition to the waste from the RO itself.

In the conventional treatment system shown in FIG. 1, chlorine or sodium hypochlorite solution (refer to item 1a) is usually dosed into the feed water at about 1 to 2 ppm free chlorine in order to control microbial growth. A coagulant such as aluminum sulfate (2a) and a polyelectrolyte polymer chemical (3a) are dosed in ppm concentrations ahead of the clarifier (4a) to create and to concentrate a gelatinous sludge of aluminum hydroxide. The large surface areas of the sludge can then trap any suspended and colloidal particulates present in the incoming surface water. The sludge is then routed to a quiescent zone of the clarifier where it is largely removed by settling to the bottom of the clarifier where it is periodically removed, then dried and disposed. Organic matters of the humic and falvic acid varieties which are typically present in surface water are also partially removed by becoming trapped in the sludge produced by addition of the coagulant.

Any residual floating sludge that is carried over from the overflow of the clarifier is subsequently removed on the downstream multimedia filter (5a). Typical composition of the filter media are sand, anthracite and garnet, which generally provide more efficient filtration than a single media filter such as a sand filter. The water is then routed to an activated carbon filter (6a) for removal of any residual chlorine. Most membranes have very limited tolerance for oxidizing agents such as chlorine and continuous exposure to even small concentrations can shorten their useful life significantly. The activated carbon also removes organic matter that is still present in the water at that step in the treatment process. The water is then finally routed through a 5 micron rated filter (8a) for removal of any last traces of suspended solids before it is fed to Reverse Osmosis System (9a). Generally, the goal at this point is to have water with maximum limits for turbidity and SDI values of 1 and 4 or better respectively.

The number of unit operations in the pretreatment process as described in FIG. 1 makes this operator-intensive, requiring daily operator attention for efficient operation. Routine tasks by operators would include refilling of chemical solutions for chlorine, coagulant, polymer, and acid or scale inhibitor; adjustment of chemical dosage for changes in the source water quality, calibration and repair of all chemical dosing systems, removal of sludge from the clarifier, backwash of the multimedia filters; periodic change out of micron filters and activated carbon media, observing, adjusting and recording of plant flow rates and periodic chemical cleaning of the membranes when they become fouled.

FIG. 2 shows the newer UF pretreatment system that is in use on especially larger RO systems. This system eliminates the use of the clarifier, multimedia, and activated carbon units as described in FIG. 1 above. A coagulant (2b) is still dosed ahead of the UF system (3b) to more efficiently trap incoming organic matter. In essence, using a UF system transfers much of the problem of fouling by suspended solids, colloidal particulates, organic compounds, and biological matter from the RO unit to the UF unit. This means that the UF unit must be periodically backwashed and also chemically cleaned when the buildup of foulants causes too much of a decrease in operating efficiency. A significant problem is the waste of a portion of the incoming water used for periodic flushing of foulants from the surfaces of the membranes, with typical percentages ranging from 5 to 15% of the influent total being fed to the UF. This is in addition to the 20 to 30 percent of the water that is additionally wasted as reject from the downstream RO unit, amounting to total water losses ranging from 25 to 45%. While this is generally not a problem for desalination of seawater or municipal wastewater, it is a major concern to operators of RO plants in arid regions of the world where water supply is quite limited. Some membrane system suppliers offer a third smaller membrane system to further treat the reject stream from the first UF in an effort to reduce water losses. However, this adds further to the already larger extra capital costs needed for the main UF, making such systems affordable to only a limited number of users.

The invention, as described by the embodiment shown in FIG. 3, uses a compact small footprint multimedia vessel for simultaneous reduction of a variety of contaminants as described hereinabove, including colloidal particulates, the Silt Density Index value of the water, dissolved organic matter, metals, dissolved anions such as sulfate, arsenic, phosphate, and dissolved silica. It requires minimum operator attention, generates comparatively much smaller volume of waste water and the capital cost is significantly lower than that for either a UF or conventional pretreatment system.

Figure 3:
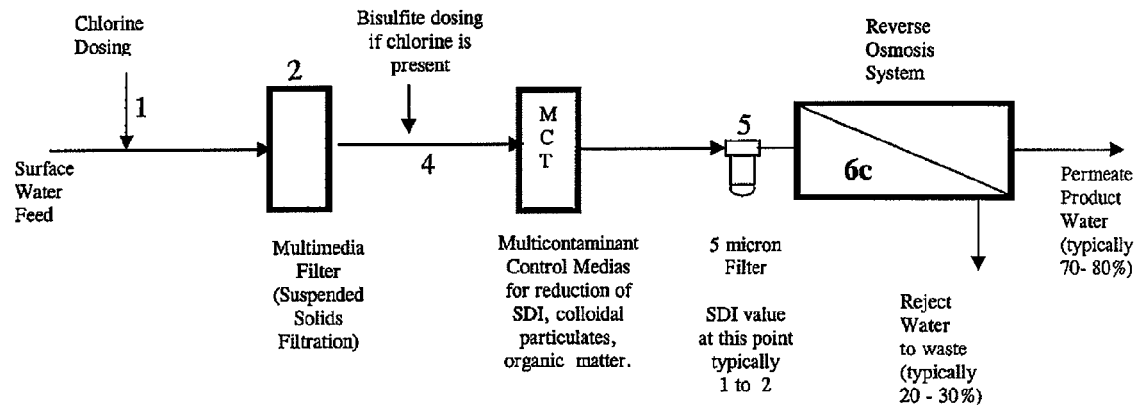
FIG. 3 shows a flow sheet of a preferred embodiment of a surface water pretreatment system of the present invention.

The embodiment described by FIG. 3, when compared to the conventional system as described in FIG. 1, does not include the clarifier and activated carbon units, similar to the UF pretreatment system in FIG. 2 above. Chlorine or sodium hypochlorite solution (refer to item 1c) is optionally dosed into the feed water at about 1 to 2 ppm free chlorine in order to control microbial growth. Any residual sludge or other suspended solids are removed on the downstream multimedia filter (2c). Typical, but non-limiting composition of the filter media include sand, anthracite and garnet, which generally provide more efficient filtration than a single media filter such as a sand filter. If the water has been dosed with chlorine or similar oxidant, the water is then dosed with sodium bisulfite to remove any residual chlorine present at this point (3c) since most RO membranes have very limited tolerance for oxidizing agents such as chlorine and continuous exposure to even small concentrations can shorten their useful life significantly. A resin component (4c) of one or more specialized ion exchange resins and/or adsorbent medias is installed downstream of the sodium bisulfite dosing point. The resin component contains a macroporous resin as described herein. Either cation or anion type resins can be used as the base resin. When an anion resin is used as the base, its capacity for removal of dissolved organic matter is increased significantly. The resin component (4c) is housed in a vessel. The vessel may be any container known in the art that can contain the resin component at the pressure required in the system. The water is then finally routed through a 5 micron rated filter (5c) or similar for removal of any last traces of suspended solids before it is fed to the Reverse Osmosis System (6c). Preferably, the water fed to the RO system has a maximum limits for turbidity and SDI values of 1 and 4 or better respectively.

When it is desired to remove dissolved silica as well as colloidal particulates, a preferred embodiment of the present invention comprises the incorporation of an iron-impregnated or iron-containing media such as cation or anion resin, natural zeolite or alumina in the resin component (4c). A strong acid cation resin can be incorporated for removal of divalent and trivalent cations. After exhaustion, all resins can be regenerated with the same regenerant mixture of brine and caustic, either at ambient or elevated temperatures.

Formation of Macroporous Resin

Conventional gel resins formed by copolymerization of monovinylidene and polyvinylidene monomers contain micropores, where the pore structure is defined by the distance between the crosslinked polymeric chains. Macroporous resins contain significant non-gel porosity in addition to normal gel porosity, within the polymer lattice. This non-gel porosity arises from channels present between the gel lattices. These microscopic channels are separate and distinct from the micropores, which are present in all crosslinked copolymers, as is well known to those skilled in the art. While the channels are themselves relatively small, they are large when compared with the micropores of the gel type resins.

As noted above, the macroporous resins can be formed by the process described in U.S. Pat. No. 6,323,249, herein incorporated by reference. The macroporous resins produced by the process described in U.S. Pat. No. 6,323,249 have extremely large-sized pores, but their narrower distribution of pore sizes gives them sufficiently high crush strength for most purposes. The narrower pore distribution, in the useful size range for the removal of colloidal matter, means that there are few uselessly small pores and needlessly large pores present.

The macroporous resins are formed by copolymerizing monoethylenically unsaturated monomers with polyvinylidene monomers in the presence of mixture of relatively moderate amounts of a water-soluble polymeric porogen with a low molecular-weight, good swelling porogen.

Useful monoethylenically unsaturated monomers include styrene, vinyltoluene, methyl-styrene, tertiary butyl styrene, vinyl pyridine, 2-methyl-5-vinyl pyridine, vinylidine chloride, tetrafluoroethylene, vinyl acetate, vinyl stearate, vinyl bromide, vinyl anisole, vinyl naphthalene, acrylic and methacrylic esters and other derivatives. Styrene is preferred.

Useful polyvinylidene monomers for use as a crosslinking agent include divinylbenzene, diisopropenylbenzene, ethyleneglyocol dimethacrylate, hexanediol diacrylate, allyl methacrylate, divinyl ketone, divinyl sulfone, trimethylolpropane, trimethacrylate, and trivinylbenzene. Divinylbenzene is preferred, and is preferably present in an amount of from 2 to 100%, more preferably 2 to 16%.

One preferred macroporous resin is formed when styrene, divinyl benzene and the porogen are mixed together with a polymerization initiator to form the monomer solution. Free radical initiators are most desirable. Free radical generating compounds which may be used to effect polymerization of the monomers include peroxides such as benzoyl peroxide, lauoryl peroxide, tertiary-butyl peroxide, hydrogen peroxide, per-compounds such as potassium persulfate, sodium perborate and ammonium persulfate and azocompounds such as azo-bisisobutyronitrile, 2,2-azobis-(2-methylbutyronitrile), 2-t-butylazo-2-cyano propane. Suitable concentrations are from 0.01 to 5.0%, more preferably 0.02 to 3.0%. The monomer phase is added to an aqueous phase for suspension polymerization of the monomers. Salt may be added to the aqueous phase to decrease the water solubility of the monomers.

Various suspension agents and stabilizers such as polyvinylalcohol, methyl cellulose, carboxymethyl cellulose, hydroxyethyl cellulose, poly(vinyl pyrrolidine), polyacrylate salts, polymethyacrylate salts, dimethyldialkylammonium polymers, nitrite and dichromatic salts, calcium phosphate salts, carbonate salts, sulfate salts, bentonite clays, gum arabic, lignosulfonates, gelatine and xanthan gums in amounts ranging from 0.01 to 0.5% by weight of the monomers may be added to the aqueous dispersion to aid in maintaining the monomers dispersed as droplets while polymerizing the same as beads.

The mixture is heated at 70° C. to 90° C. for from 6 to 15 hours filtered, washed, and dried. Following filtration, washing and drying, the crosslinked copolymer resin can be sulfonated with sulfuric acid, oleum, sulfur trioxide, or chlorosulfonic acid as the sulfonating agent to form a cation exchanger or, alternatively, it may be chloroalkylated and subsequently aminated to form-an anion exchanger.

A wide variety of amines including primary, secondary, and tertiary alkylamines or arylamines can be employed in the anination reaction. Polyalkylenepolyamines such as ethylenediamine, diethylenetriamine, triethylenetetramine, tetraethylenepentamine and propylenediamine can also be used. Aminoalcohols and dimethylaminoethanol are also useful. A preferred embodiment employs a trialkylamine as the aminating agent, producing a quaternary anion exchanger. Generally, the alkyl radical does not contain more than 4 carbon atoms.

When the water stream to be purified has colloidal silica and other such colloidal particulate matter which needs to be removed prior to reverse osmosis, a strong base anion exchange prepared with trimethylamine resin is preferred. Although resins with a strong base functionality are preferred for the removal of colloidal silica and other such colloidal particulate matter, weak base anion exchange resins having the same macroporous structure will also perform. Such weak base anion exchange resins are prepared in the same manner as the strong base resins with the exception that the trimethylamine is replaced with dimethyl amine, diethyl amine, monomethyl amine, ethanol amines etc. These weak base anion exchange resins, aside from the differences in ion exchange functional groups, are essentially identical in morphological structure as the strong base anion exchange resins, particularly about their large pore sizes.

Methods of producing ion-exchange resins from corresponding crosslinked copolymer resins are known in the art. Anion exchange resins produced by chloromethylating polystyrene and subsequently aminating are disclosed in U.S. Pat. Nos. 2,591,573; 2,591,574; 2,616,099; 2,616,877; 2,629,710; 2,631,999; 2,632,000; 2,642,417; 2,725,361; 2,794,785; 3,422,160; 3,311,602; 2,953,547; 4,225,677; and 3,425,990. Strongly acid cation exchangers obtained by sulphonation of crosslinked polymers, such as for example crosslinked polystyrenes are disclosed in U.S. Pat. Nos. 2,366,007, 2,466,675, 2,500,149, 2,631,127 and 2,664,801. All U.S. patents and published applications cited herein are hereby incorporated by reference.

The macroporous resin removes colloidal particulate matter, such as silica, from the water stream by providing novel macroporous resins characterized by pore diameter ranging in size from 4,000 to 500,000 Angstroms, or more preferably 4,000 to 200,000 Angstroms, or even more preferably from 10,000 to 200,000 Angstroms and having particularly high crush strength and high pore volume. The anion exchange resins can be used to remove colloids or particulate matter, such as colloidal silica or hydrous oxides, or can be used in conjunction with cation exchange resins to simultaneously achieve deionization and colloidal removal. In addition, the anion exchange resins of the invention are capable of effectively removing acids of relatively high molecular weight such as, for example, humic acid, and are capable of removing viruses from aqueous solutions.

Definitions

The term "single chemical regenerant" means both a single chemical regenerant and a mixture of chemicals using a single regenerant.

The term highly macroporous resins, as used herein, means resins with pores with large diameters. The average pore diameter of a highly macroporous resin ranges at least about 1,000 Angstrom and typically has an average pore diameters (D50) of at least about 20,000 Angstroms.

Orthoporous resins, as the term is used herein, are highly macroporous resins having a substantial number of pore diameters ranging from 10,000 to 500,000 Angstroms.

As used herein, the term "simultaneous," means at the same time or within a few minutes. When used in conjunction with resin regeneration or rejuvenation, "simultaneous regeneration or rejuvenation" means that the regeneration or rejuvenation occurs in a single process step by the addition of a single regenerant. It is understood that one chemical regeneration process may proceed at a different rate than another chemical regeneration process.

The term 'about' or 'approximately' means within an acceptable error range for the particular value as determined by one of ordinary skill in the art, which will depend in part on how the value is measured or determined, i.e., the limitations of the measurement system, i.e., the degree of precision required for a particular purpose, such as a pharmaceutical formulation. For example, "about" can mean within 1 or more than 1 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated, the term "about" meaning within an acceptable error range for the particular value should be assumed.

As used herein and in the appended claims, the singular forms "a," "an," and "the," include plural referents unless the context clearly indicates otherwise. Thus, for example, reference to "a molecule" includes one or more of such molecules, "a resin" includes one or more of such different resins and reference to "the method" includes reference to equivalent steps and methods known to those of ordinary skill in the art that could be modified or substituted for the methods described herein.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Figure 4:
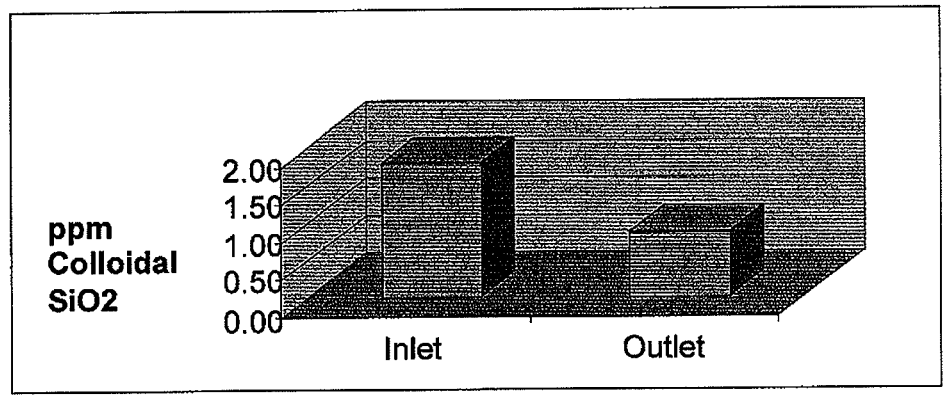
FIG. 4 shows the reduction and removal capacity of one embodiment of the resin component for reduction of colloidal silica (average of 50% removal).
Figure 5:
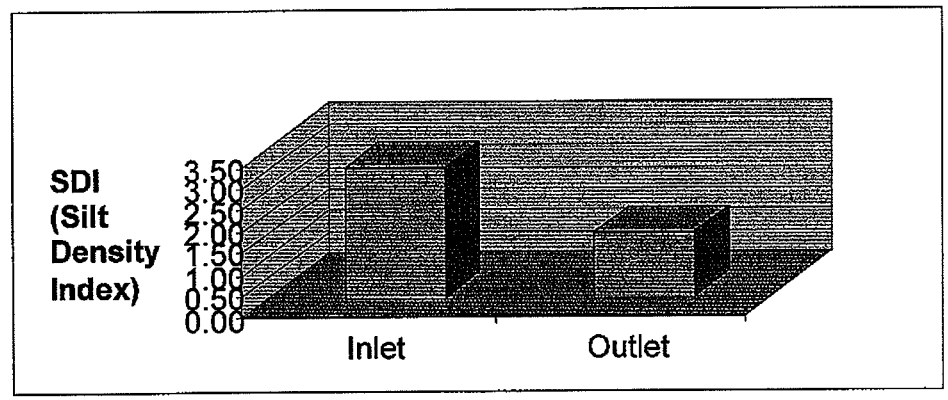
FIG. 5 shows the reduction and removal capacity of one embodiment of the resin component for reduction of Silt Density Index (average of 49% reduction).
Figure 6:
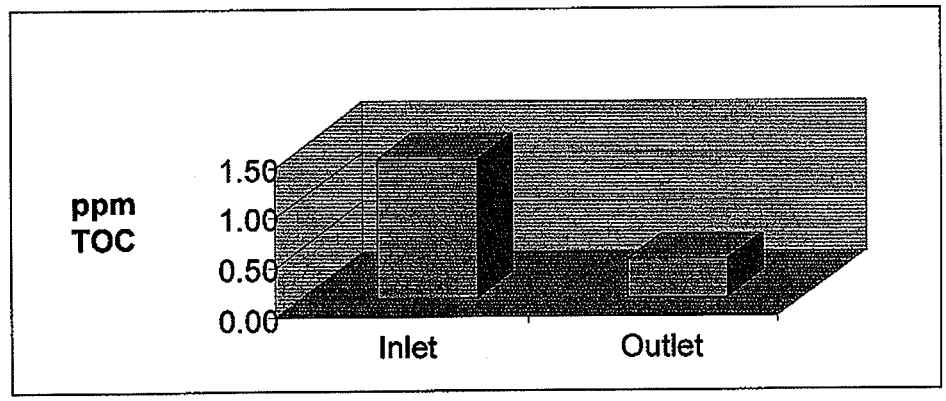
FIG. 6 shows the reduction and removal capacity of one embodiment of the resin component for reduction of organic matter (average of 74% removal).
Figure 7:
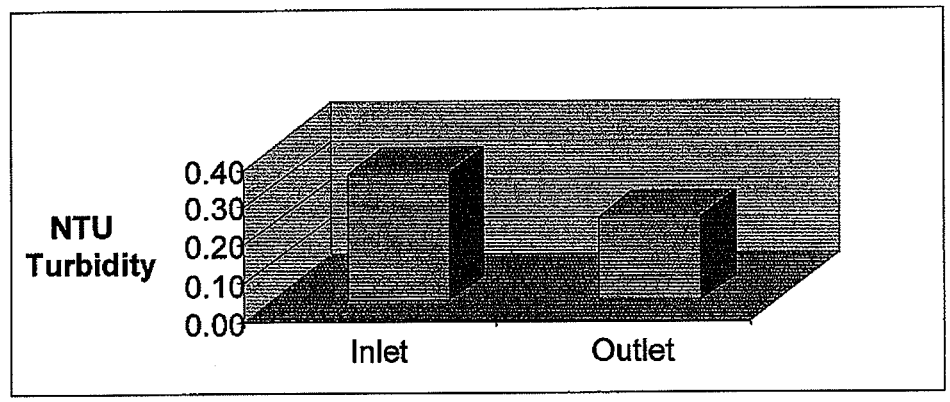
FIG. 7 shows the capacity of one embodiment of the resin component for turbidity reduction (average of 31%).
Figure 8:
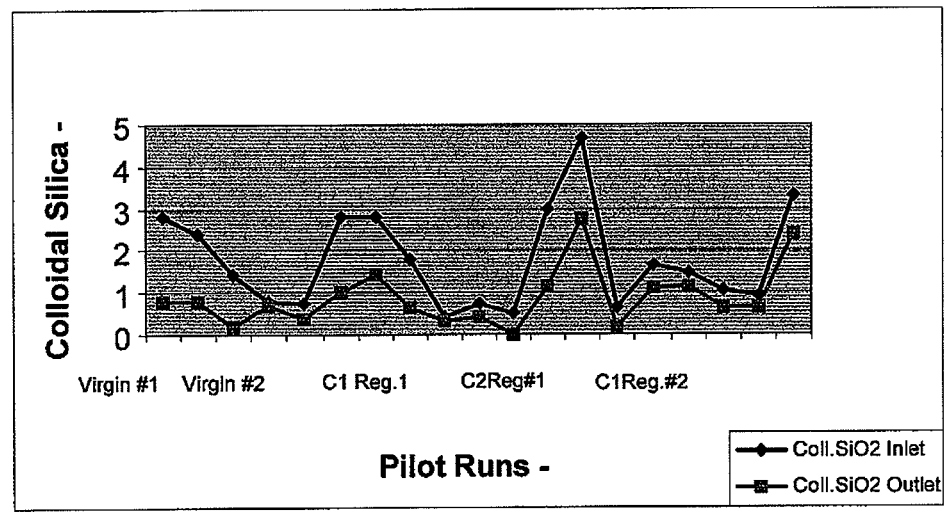
FIG. 8 shows the reduction and removal capacity of one embodiment of the resin component for reduction of colloidal silica (average of 50% removal). Data is shown for a test pilot system comprised of two 1 liter cartridges containing two volumes of the resin component used alternately to treat the same surface water supply containing naturally varying influent colloidal silica values ranging from 0.5 to 4.5 ppm, with the water after treatment through the cartridge containing reduced values of colloidal silica ranging from 0.1 to 2.8 ppm, representing and average of approximately 50% reduction in colloidal silica. Flow through each cartridge was controlled at 12 bed volumes per hour, with each cartridge treating a total of 864 liters before being removed for regeneration or rejuvenation of the resin component. During the time that one cartridge was removed for regeneration, the alternate cartridge was installed. Cartridge 1 effluent values are represented by designations, "Virgin#1", "C1Reg.1", and "C1Reg#2" with "C1Reg.1" and "C1Reg2" representing the values after regenerations 1 and 2. Cartridge 2 effluent values are represented by designations, "Virgin#2" and "C2Reg#1" representing values for first use and after first regeneration.
Figure 9:
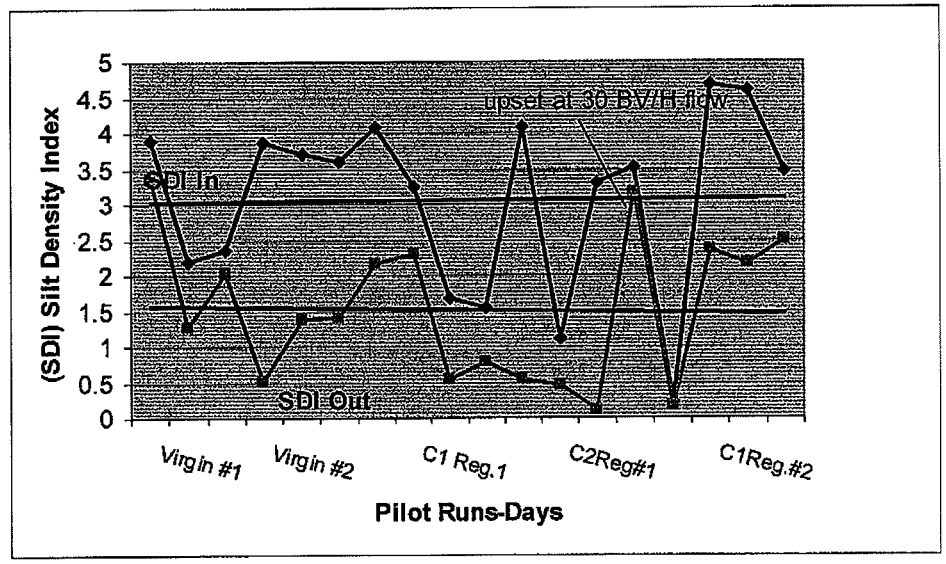
FIG. 9 shows the reduction and removal capacity of one embodiment of the resin component for reduction of Silt Density Index (average of 49% reduction). Data is shown for a test pilot system comprised of two 1 liter cartridges containing two volumes of the resin component used alternately to treat the same surface water supply containing naturally varying influent colloidal silica values ranging from 0.5 to 4.5 ppm, with the water after treatment through the cartridge containing reduced values of colloidal silica ranging from 0.1 to 2.8 ppm, representing and average of approximately 50% reduction in colloidal silica. Flow through each cartridge was controlled at 12 bed volumes per hour, with each cartridge treating a total of 864 liters before being removed for regeneration or rejuvenation of the resin component. During the time that one cartridge was removed for regeneration, the alternate cartridge was installed. Cartridge 1 effluent values are represented by designations, "Virgin#1", "C1Reg.1", and "C1Reg#2" with "C1Reg.1" and "C1Reg2" representing the values after regenerations 1 and 2. Cartridge 2 effluent values are represented by designations, "Virgin#2" and "C2Reg#1" representing values for first use and after first regeneration.
Figure 10:
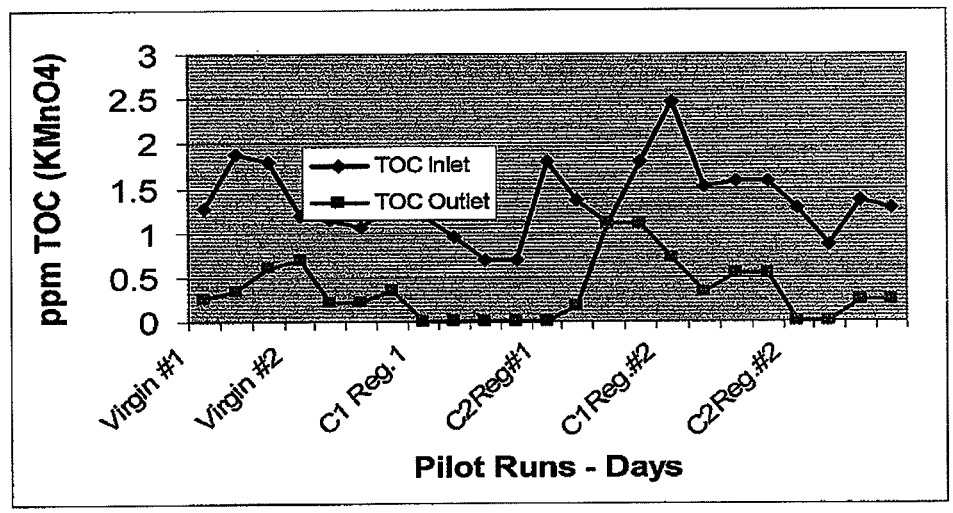
FIG. 10 shows reduction and removal capacity of one embodiment of the resin component for reduction of organic matter (average of 74% removal). Data is shown for a test pilot system comprised of two 1 liter cartridges containing two volumes of the resin component used alternately to treat the same surface water supply containing naturally varying influent colloidal silica values ranging from 0.5 to 4.5 ppm, with the water after treatment through the cartridge containing reduced values of colloidal silica ranging from 0.1 to 2.8 ppm, representing and average of approximately 50% reduction in colloidal silica. Flow through each cartridge was controlled at 12 bed volumes per hour, with each cartridge treating a total of 864 liters before being removed for regeneration or rejuvenation of the resin component. During the time that one cartridge was removed for regeneration, the alternate cartridge was installed. Cartridge 1 effluent values are represented by designations, "Virgin#1", "C1Reg.1", and "C1Reg#2" with "C1Reg.1" and "C1Reg2" representing the values after regenerations 1 and 2. Cartridge 2 effluent values are represented by designations, "Virgin#2" and "C2Reg#1" representing values for first use and after first regeneration.
Figure 11:
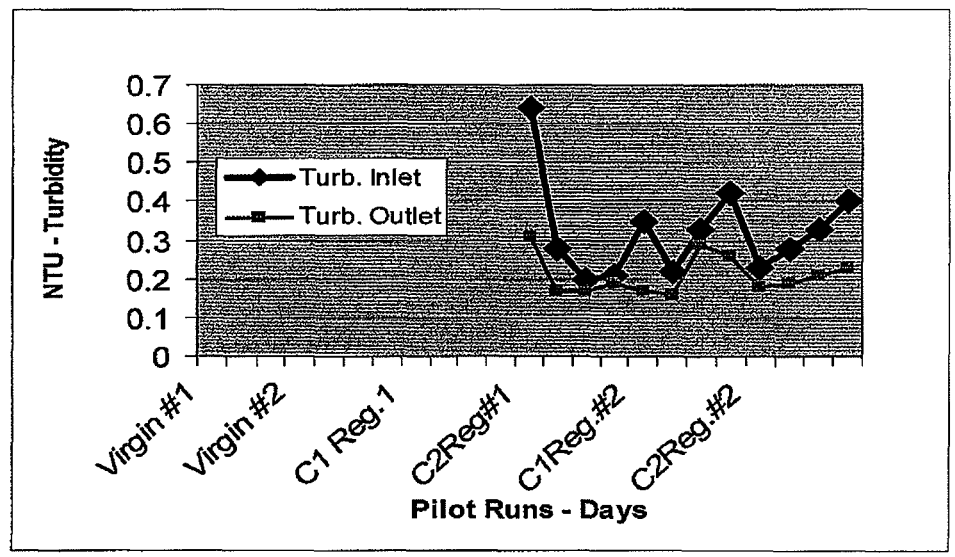
FIG. 11 shows the capacity of one embodiment of the resin component for turbidity reduction (average of 31%). Data is shown for a test pilot system comprised of two 1 liter cartridges containing two volumes of the resin component used alternately to treat the same surface water supply containing naturally varying influent colloidal silica values ranging from 0.5 to 4.5 ppm, with the water after treatment through the cartridge containing reduced values of colloidal silica ranging from 0.1 to 2.8 ppm, representing and average of approximately 50% reduction in colloidal silica. Flow through each cartridge was controlled at 12 bed volumes per hour, with each cartridge treating a total of 864 liters before being removed for regeneration or rejuvenation of the resin component. During the time that one cartridge was removed for regeneration, the alternate cartridge was installed. Cartridge 1 effluent values are represented by designations, "Virgin#1", "C1Reg.1", and "C1Reg#2" with "C1Reg.1" and "C1Reg2" representing the values after regenerations 1 and 2. Cartridge 2 effluent values are represented by designations, "Virgin#2" and "C2Reg#1" representing values for first use and after first regeneration.

The invention was demonstrated using a continuously flowing surface water supply from a river with naturally varying composition with respect to colloidal silica, organics matter, turbidity and silt density index (SDI) values. The river water supply pretreatment system contained softening and clarification using chlorine, aluminum sulfate and calcium hydroxide, followed by sand filtration and activated carbon. Prior to use, the water was filtered through a 1-liter cartridge filter of spiral wound cotton fiber to remove suspended solids matter. The filtered water was then passed at a flowrate of 12 BV/H alternately through two 1 liter cartridges, each containing 1 liter of the resin component and comprised of a 50:50 mixture of Purolite A501P, a macroporous anion resin of high porosity and high crush strength as described in U.S. Pat. No. 6,323,249 to Dale, et al., and Purolite A-860, a macroporous acrylic strong base anion resin, both resins manufactured by Purolite Intl. Ltd. During the test period, the influent water composition varied naturally; colloidal silica ranged from 0.5 to 4.5 ppm, dissolved organic matter ranged from 0.6 to 2.5 ppm, turbidity ranged from 0.2 to 0.65 NTU, and silt density index (SDI) ranged from 0.25 to 4.75 SDI units. Colloidal silica concentration, silt density index, concentration of organic matter, and turbidity were each measured at both the inlet and outlet of the ion exchange vessel. FIG. 4 shows the average reduction in colloidal silica over the test period of approximately 50%, with colloidal silica being reduced from an average influent value of 1.5 ppm to an average effluent value of 0.75. FIG. 5 shows the average reduction in the SDI from an average influent value of 3.0 to an average effluent value of approximately 1.5. FIG. 6 shows the average reduction in dissolved organic matter from an average influent value of 0.92 ppm to an average effluent value of 0.25 ppm. FIG. 7 shows the average reduction in turbidity from an influent value of 0.22 NTU to an average effluent value of approximately 0.15 NTU. FIGS. 8, 9, 10 and 11 show the change in influent values and the corresponding changes in effluent values for colloidal silica, silt density index, organic matter, and turbidity respectively.

Example 2

Figure 12:
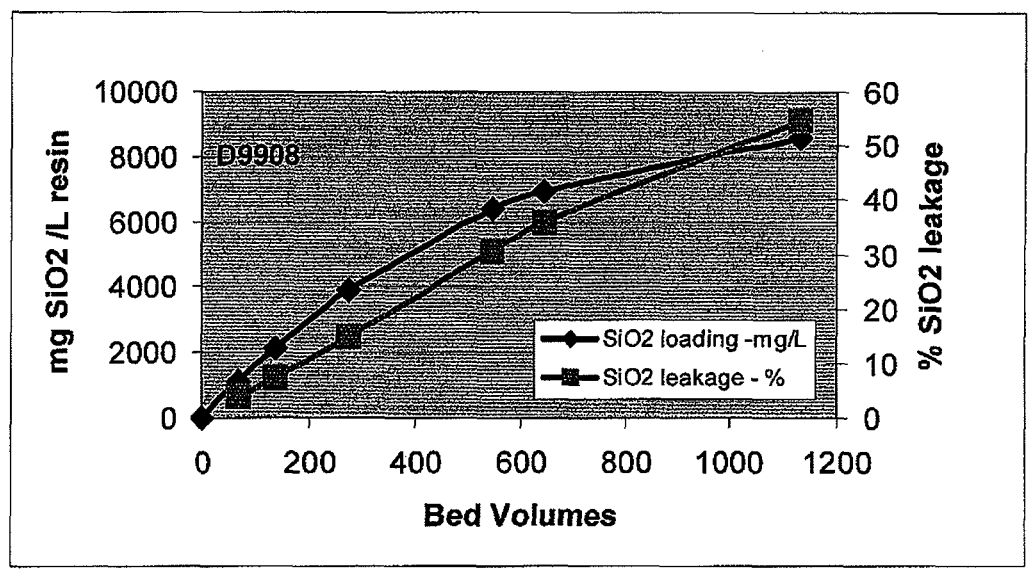
FIG. 12 shows the capacity of one embodiment of the resin component for dissolved silica removal using a high capacity iron-impregnated resin. This Figure shows that an average of 8000 mg silica per liter of resin were removed to 50% breakthrough point when treating a typical influent water containing 16.8 ppm silica at a pH of 8.2 and a flow rate of 12 bed volumes per hour.

The invention was demonstrated by treating Philadelphia city water supply containing approximately 2 ppm silica, a pH of 8.2, total dissolved solids of approximately 210 ppm, and a total organic matter content raging from 1.5 to 2.5 ppm measured as total organic carbon (TOC). The water was artificially spiked with additional silica to achieve 16.8 ppm of silica in keeping with typical levels experienced in many part of the United States where ROs are used with attendant silica deposition problems. The resin component, comprising a 16 to 50 US mesh size sample of 1 liter of ArsenX$^{np}$ (with experimental code of D9908) was installed in a cartridge and the water was passed through the resin component at a flowrate of 12 bed volumes per hour. The influent and effluent dissolved silica concentration was measured periodically until the breakthrough of silica in the effluent reached 50 percent of the influent value as displayed in FIG. 12. A mass balance was done to determine the fraction of silica that was loaded on the resin. At the 50% breakthrough point for silica in the effluent, after approximately 1200 liters of water had been treated, the total silica loaded on the resin was determined to be approximately 8 grams of silica per liter of resin.

Example 3

Figure 13:
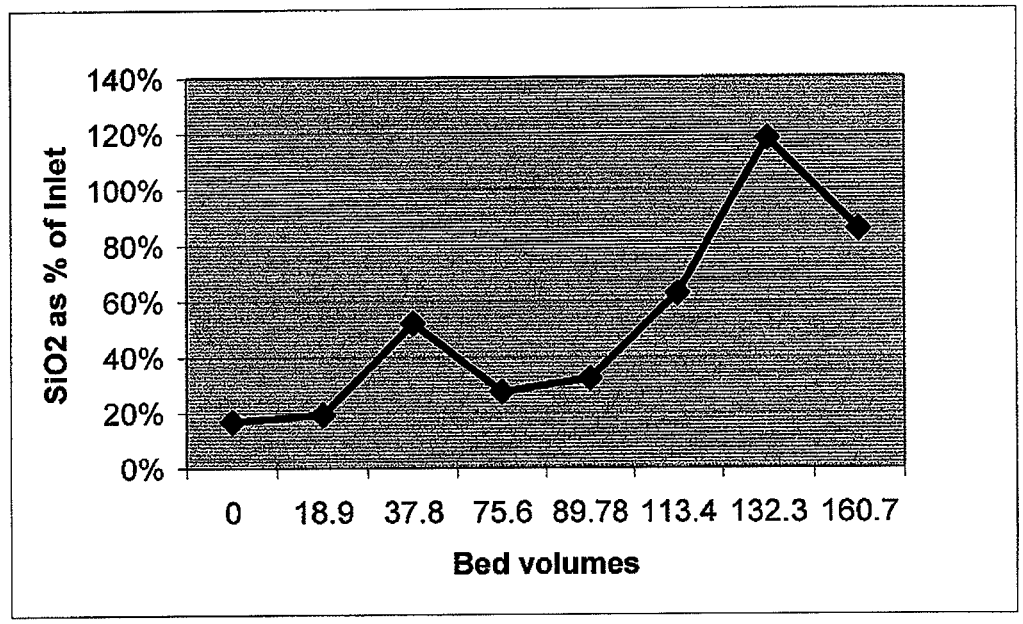
FIG. 13 shows the capacity of one embodiment of the resin component for dissolved silica removal using a high capacity iron-impregnated resin. The silica is removed from the blowdown form a 2400 psig steam generator. The silica removal capacity under adverse elevated levels of silica of 77 ppm and pH of 9.5 is shown at significantly faster velocity of 57 bed volumes per hour. Capacity achieved was approximately 6000 mg silica per liter of resin to 50% silica breakthrough.

Water from the blowdown water stream of a 2400 psig steam generator boiler was recovered and treated for reuse by passing through a 1 liter cartridge filled with 1 liter of the resin component comprising ArsenX$^{np}$ (with experimental code D-9908) at a relatively flow rate of 57 bed volumes per hour. The blowdown water contained a very high concentration of silica at average of 77 parts per million and a relatively high pH of 9.5. The influent and effluent silica concentrations were measured periodically until the silica concentration in the effluent was approximately equal to that in the influent water. A mass balance was done to determine the fraction of silica that was loaded on the resin and this was determined to be approximately 6,000 milligrams of silica per liter of resin with a total of 161 liters of water treated as displayed in FIG. 13. The loading was 8.7 g $SiO_2$ per liter of media and a silica breakthrough of approximately 60% at the end of the test.

Example 4

Figure 14:
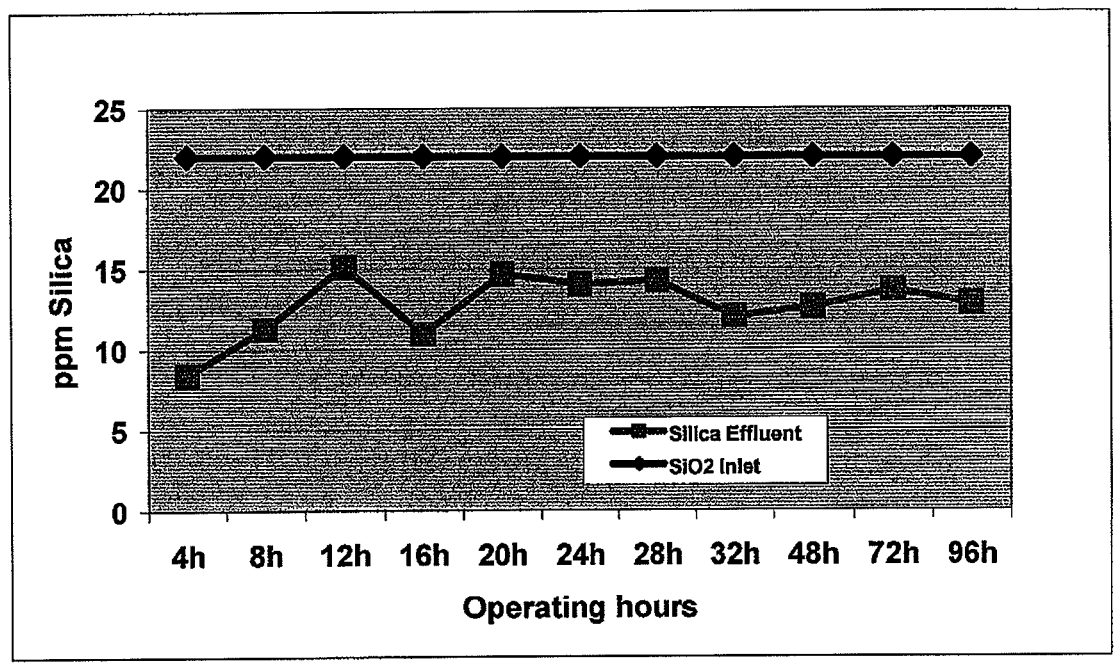
FIG. 14 shows the removal of silica from NSF53 Challenge water at pH 7.7. This test provides a loading of approximately 17 grams of silica per liter of resin after 96 hours and a silica breakthrough of approximately 60% at the end of the test.

A 18 ml sample of D9908 iron-impregnated anion resin, also known as ArsenXnp, was put into a glass column and a challenge solution, referred to as a NSF53. Challenge solution was passed through the resin at a flow rate of 20 BV/H at ambient temperature. The challenge solution contained 51 ppm Ca, 17.8 ppm Mg, 114 ppm Na, 67 ppm $SO_4$, 1.64 ppm $PO_4$, 97.6 ppm $HCO_3$, 140 ppm Cl, 22 ppm $SiO_2$ and had a pH of 7.7. Effluent samples were taken every 4 hours for a total time of 96 hours and the samples were analyzed for silica concentration and pH. The results are shown in FIG. 14, indicating a loading of approximately 17 grams of silica per liter of resin after 96 hours and a silica breakthrough of approximately 60% at the end of the test.

Example 5

Figure 15:
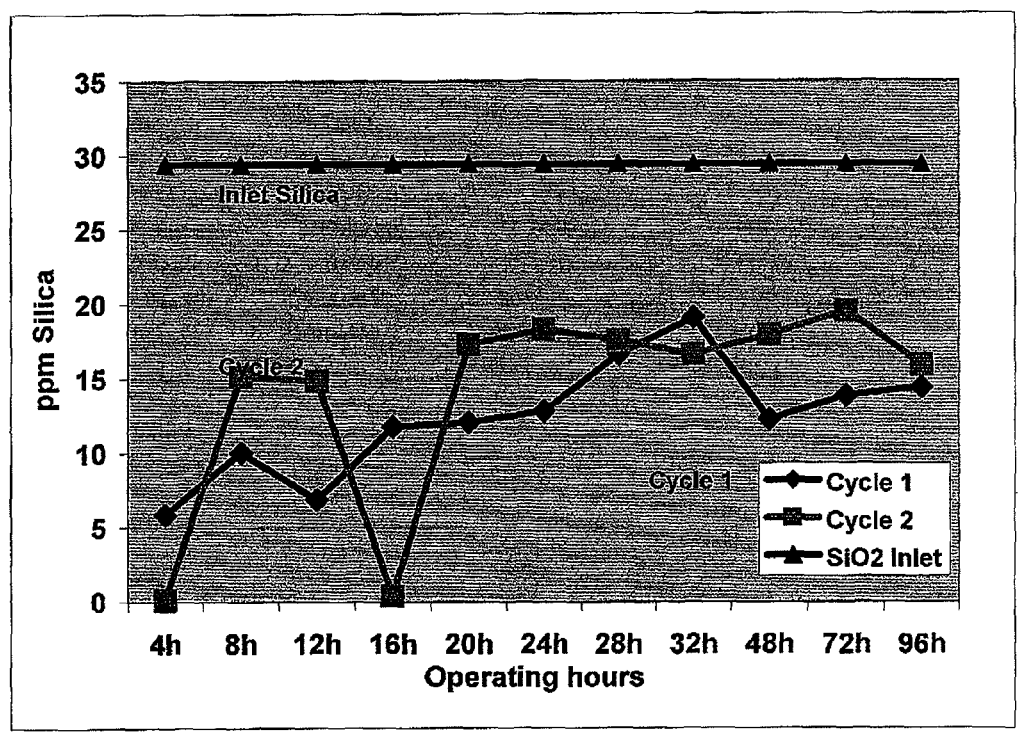
FIG. 15 shows the removing and regenerating of silica with reused regenerant at pH 8.0. This test provides a loading of approximately 34 grams of silica per liter of resin after 96 hours and a silica breakthrough of approximately 52% at the end of the test. During a second loading cycle with the same challenge solution and effluent sample, silica loading was 26 grams silica per liter of resin, or approximately 76 percent of the loading for the first test.

A 18 ml sample of D9908 iron-impregnated anion resin, also known as ArsenXnp, was put into a glass column and a challenge solution, referred to as a NSF53. Challenge solution was passed through the resin at a flow rate of 20 BV/H at ambient temperature. The challenge solution contained 46.8 ppm Ca, 13.8 ppm Mg, 117 ppm Na, 60 ppm $SO_4$, 0.01 ppm $PO_4$, 125 ppm $HCO_3$, 140 ppm Cl, 29 ppm $SiO_2$ and had a pH of 8.0. Effluent samples were taken every 4 hours for a total time of 96 hours and the samples analyzed for silica concentration and pH. The results are shown in FIG. 15, indicating a loading of approximately 34 grams of silica per liter of resin after 96 hours and a silica breakthrough of approximately 52% at the end of the test. The sample of resin was then regenerated coflow with 6 bed volumes of 4% caustic soda solution at ambient temperature at a flow rate of 2 BV/H. The resin was then subjected to a second loading cycle with the above mentioned challenge solution and effluent sample again taken and analyzed. Silica loading on the resin for the second cycle was 26 grams silica per liter of resin, or approximately 76 percent of the loading for the first test.

Example 6

The ease of regenerability and the ability to reuse the regenerant a multiple of times was demonstrated using two field pilots, each comprised of a 1 liter cartridge containing a 50:50 mixture of Purolite A-501P, a macroporous anion resin of high porosity and high crush strength as described in U.S. Pat. No. 6,323,249 to Dale et al., and Purolite A-860, a macroporous acrylic strong base anion resin, both resins manufactured by Purolite Intl. Ltd.

This aspect of the invention was demonstrated using a continuously flowing surface water supply from a river with naturally varying composition with respect to colloidal silica, organics matter, turbidity and silt density index (SDI) values. The river water supply pretreatment system consisted of softening and clarification using chlorine, aluminum sulfate and calcium hydroxide, followed by sand filtration and activated carbon. Prior to use, the water was filtered through a 1-liter cartridge filter of spiral wound cotton fiber to remove suspended solids matter. The filtered water was then passed at a flowrate of 12 BV/H through the two cartridges for a total of 72 hours. During the test period, the influent water composition varied naturally; colloidal silica ranged from 0.5 to 4.5 ppm, dissolved organic matter ranged from 0.6 to 2.5 ppm, turbidity ranged from 0.2 to 0.65 NTU, and silt density index (SDI) ranged from 0.25 to 4.75 SDI units. Colloidal silica concentration, silt density index, concentration of organic matter, and turbidity were each measured at both the inlet and outlet of the ion exchange vessel.

Figure 16:
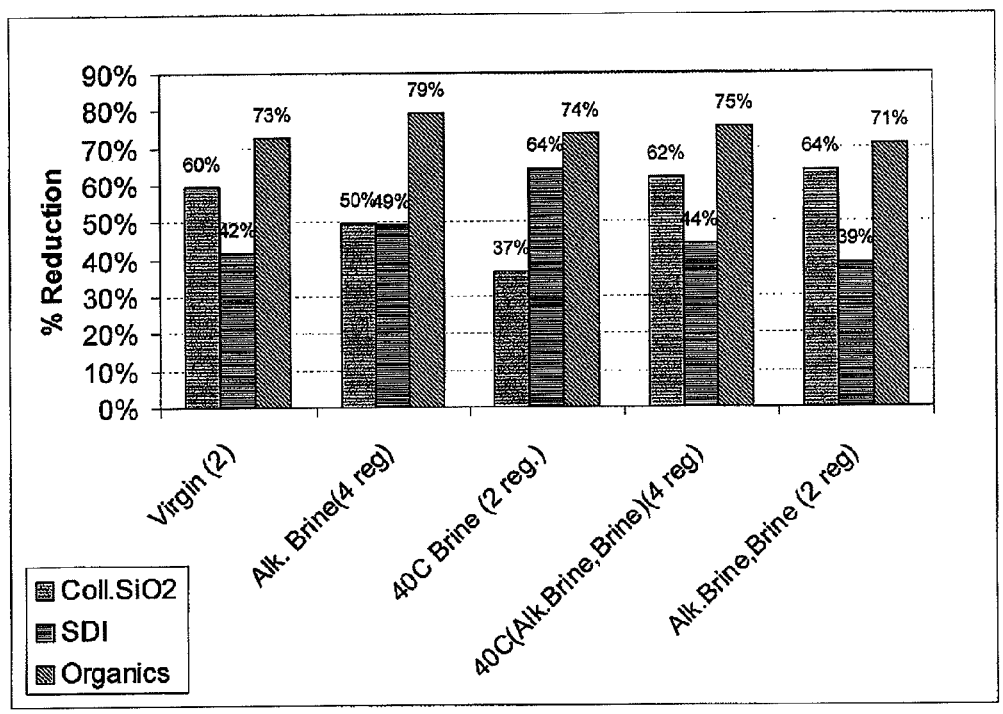
FIG. 16 shows the field pilots with multiple regenerations, reusing different regenerants. The virgin resin reduced the colloidal silica, SDI and organic matter by 60%, 42% and 73% respectively. Reduction in the colloidal silica, SDI and organic matter after additional loading and regeneration cycles are shown.

The average results of the two pilots showed that the virgin resin had reduced the colloidal silica, SDI and organic matter by 60%, 42% and 73% respectively as shown in FIG. 16. The resin samples were then regenerated with a 10% sodium chloride/2% caustic soda solution containing 160 grams NaCl mixed with 32 grams of NaOH at a flow rate of 2 BV/H at ambient temperature. The cartridges were then subjected to second and third loading cycles with the same feedwater described above and regenerated twice with the same regenerant solution. Average reduction rate for colloidal silica, SDI and organic matter for the two cycles were 50%, 49% and 79% respectively (i.e., Alk. Brine (4 reg)).

Two additional loading and regeneration cycles were then performed with the same influent water but with a regenerant solution comprised of 10% NaCl for a dosage of 160 grams NaCl per liter of resin and at 40° C. instead of ambient temperature as the previous experiments. The average reduction rates for colloidal silica, SDI and organic matter for these two experiments were 37%, 64% and 74% respectively (i.e., 40 C Brine (2 reg)).

Four additional loading and regeneration cycles were then performed with the same influent water but with a regenerant solution comprised of a two step approach, with the first step comprised of 10% NaCl/2% NaOH at dosages of 160 grams/liter and 32 grams/liter respectively and heated to 40° C. The second step comprised a solution of just 10% NaCl at a dosage of 64 grams/liter at ambient temperature. Average reduction in colloidal silica, SDI and organic matter were 62%, 44% and 75% respectively (i.e., 40 C Alk. Brine, Brine (4 reg)).

Two additional loading and regeneration cycles were then performed with the same influent water but with a regenerant identical to the last four cycles above, but at ambient temperature instead of heating to 40° C. Average reduction of colloidal silica, SDI and organic matter were 64%, 39% and 71% respectively (i.e., Alk. Brine, Brine (2 reg)).

As demonstrated in this example, the reduction of organic matter after multiple loading and regeneration cycles is similar for each of the tested regenerants. For the best reduction in SDI, regeneration using 40 C brine is the best, and alkali brine also good. For the best reduction in colloidal silica, regeneration using alkali brine and brine is the most preferred. While temperature control is not needed, extra brine step is helpful.

For the best reduction in turbidity, regeneration using alkali brine at ambient temperature provided a 32% reduction.

What is claimed is:

1. A method of purifying water containing colloidal particulates of organic matter comprising:
   a) pretreating the water by passing the water through a vessel containing a resin component, wherein the resin component comprises a highly macroporous anion exchange resin having a plurality of pores having a pore diameter in the range of 4,000 to 500,000 Angstroms and a crush strength or Chatillon value of about 24 g/bead to about 50 g/bead (710 µm bead diameter);

b) feeding the water exiting the resin component to a reverse osmosis membrane or a nanofiltration membrane to produce permeate water; and c) periodically regenerating the resin component by removing contaminants comprising colloidal particulates of organic matter from the resin by passing a solution of sodium chloride through the vessel, wherein the resin component reduces the organic colloidal particulate matter and the Silt Density Index (SDI) content of the water by at least 20 percent of the influent values, the solution of sodium chloride is essentially free of sodium hydroxide and the flow of water from the resin component to the reverse osmosis or nanofiltration membrane is continuous.

2. The method of claim 1, wherein the macroporous resin has a pore volume of at least 0.36 ml/g (dry).

3. The method of claim 2, wherein the macroporous resin has an average pore diameter in the range of 10,000 to 500,000 Angstroms, and a pore volume of at least 0.60 ml/g (dry).

4. The method of claim 2, wherein the macroporous resin has a pore diameter in the range of 10,000 to 200,000 Angstroms and a pore volume of at least 0.60 ml/g (dry).

5. The method of claim 1, wherein the macroporous resin is formed from the polymerization of a solution of (a) a monoethylenic monomer, (b) a polyethylenic monomer, (c) a free-radical initiator, and (d) 20-40 pph poly(alkylene oxide) pore-forming agent or a mixture of the 20-40 pph poly(alkylene oxide) pore-forming agent with toluene.

6. The method of claim 1, wherein the macroporous resin has a pore diameter in the range of 5,000 to 100,000 Angstroms and a pore volume of at least 0.6 ml/g (dry).

7. The method of claim 1, wherein the macroporous resin is chloromethylated and then aminated.

8. The method of claim 1, wherein the resin component further comprises one or more strong base resin(s).

9. The method of claim 1, wherein regeneration comprises recirculating the sodium chloride by recovering the effluent from the vessel containing the resin component and re-introducing it to the vessel to make repeated passes through the resin component.

10. The method of claim 1, wherein the resin component further comprises at least one of polystyrene or acrylic polymer matrix-based anion exchange resin.

11. The method of claim 1, wherein the sodium chloride solution is added to the resin component at a rate of 2 to 20 bed volumes per hour, wherein the bed volume is the equivalent liquid volume occupied by the resin in the vessel.

12. The method of claim 1, wherein the anion exchange resin is in chloride form.

13. The method of claim 1, wherein the colloidal particulates of organic matter comprise humic, fulvic, or tannic acids.

14. The method of claim 1, wherein sodium hydroxide is excluded from the solution of sodium chloride.

* * * * *